United States Patent [19]
Ariyoshi et al.

[11] Patent Number: 5,636,199
[45] Date of Patent: Jun. 3, 1997

[54] AUTOMATIC DISC CHANGER FOR RETRIEVING A LOWERMOST DISC FROM A STACK OF STORED DISCS AND RETURNING THE DISC TO THE TOP OF THE STACK

[75] Inventors: Yuji Ariyoshi, Toyonaka; Masanori Onishi, Hirakata, both of Japan

[73] Assignee: Matsushita Electric Industrial Co., Ltd., Osaka-fu, Japan

[21] Appl. No.: 422,918

[22] Filed: Apr. 17, 1995

[30] Foreign Application Priority Data

Apr. 15, 1994 [JP] Japan .................... 6-076833

[51] Int. Cl.[6] .................... G11B 17/10; G11B 17/20
[52] U.S. Cl. .................... 369/191; 369/36; 360/98.06
[58] Field of Search .................... 369/192, 34, 36, 369/75.2, 191, 193, 201, 202; 360/98.04, 98.05, 98.06, 92

[56] References Cited

U.S. PATENT DOCUMENTS

| 4,023,207 | 5/1977 | Cook .................... 360/92 |
|---|---|---|
| 4,195,321 | 3/1980 | Chelin et al. .................... 360/98.06 |
| 4,636,888 | 1/1987 | Sidebottom .................... 360/92 |
| 4,646,178 | 2/1987 | Garratt et al. .................... 360/98.06 |
| 5,123,001 | 6/1992 | Nakamichi et al. .................... 369/36 |
| 5,177,722 | 1/1993 | Nakamichi et al. .................... 369/36 |
| 5,197,057 | 3/1993 | Iyama et al. .................... 369/37 |

FOREIGN PATENT DOCUMENTS

| 01151056 | 6/1989 | Japan .................... 369/191 |
|---|---|---|

Primary Examiner—Stuart S. Levy
Assistant Examiner—Kevin M. Watkins
Attorney, Agent, or Firm—Wenderoth, Lind & Ponack

[57] ABSTRACT

An automatic disc changer which includes a tray storage section for accommodating a stack of disc trays each having an opening defined in a support surface thereof on which a corresponding information carrier disc is placed. An information pick-up unit is disposed at a location adjoining the tray storage section and supported for movement up and down between elevated and lowered positions corresponding respectively to play and stand-by positions. A tray transport mechanism is provided for transporting a lowermost one of the stack of the disc trays within the tray storage section towards the stand-by position immediately above the information pick-up unit. Also, tray elevating mechanism carrying the information pick-up unit and operable to elevate the disc tray at the stand-by position towards the play position is located in the play section. A tray returning mechanism is provided for returning the disc tray at the play position back to the tray storage section and immediately above the stack of the disc trays remaining within the tray storage section.

20 Claims, 11 Drawing Sheets

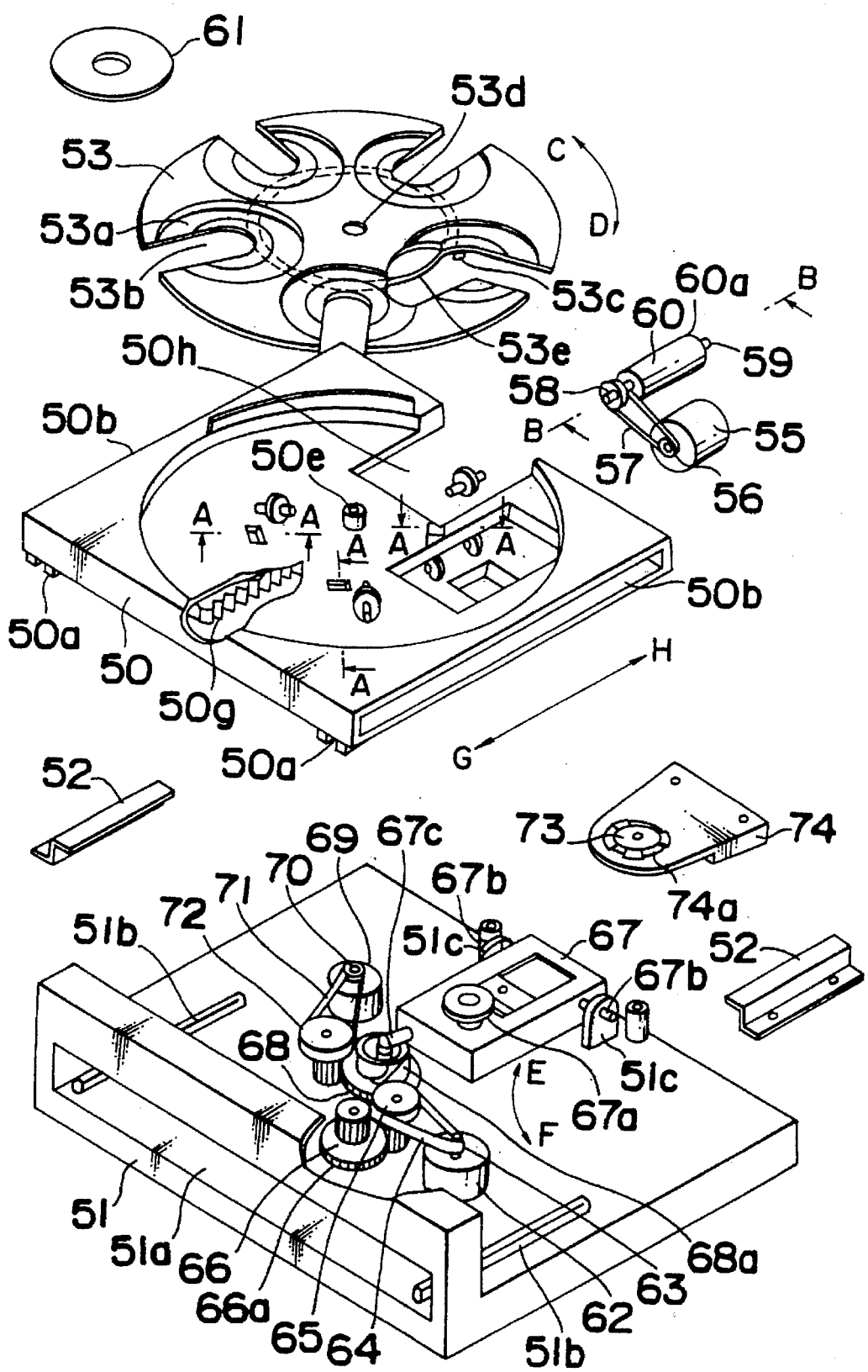
Fig. 14 - Prior Art

Fig. 15 - Prior Art
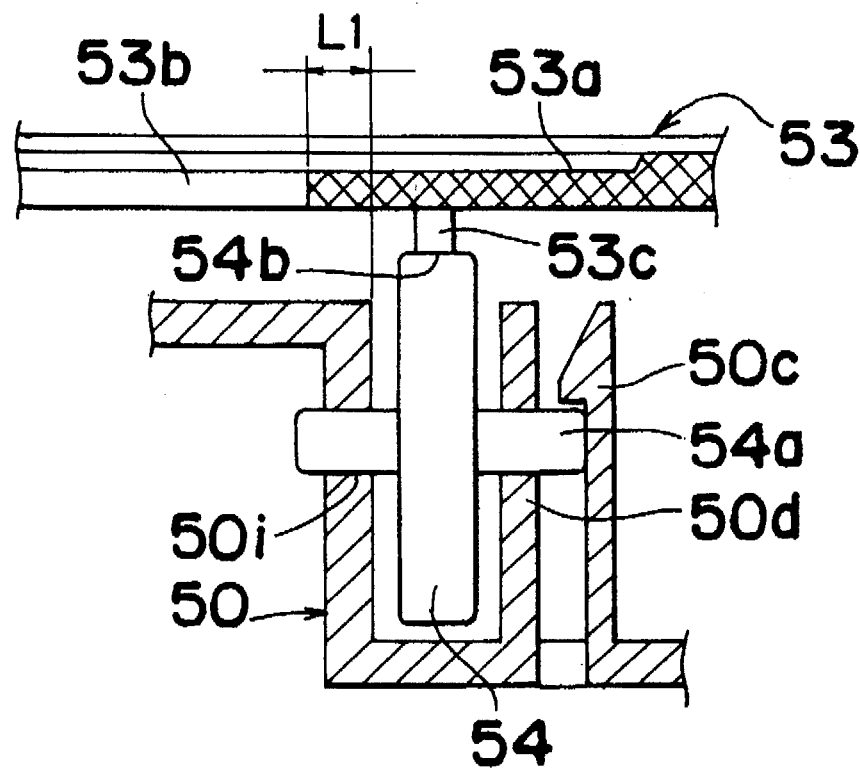
Fig. 16 - Prior Art
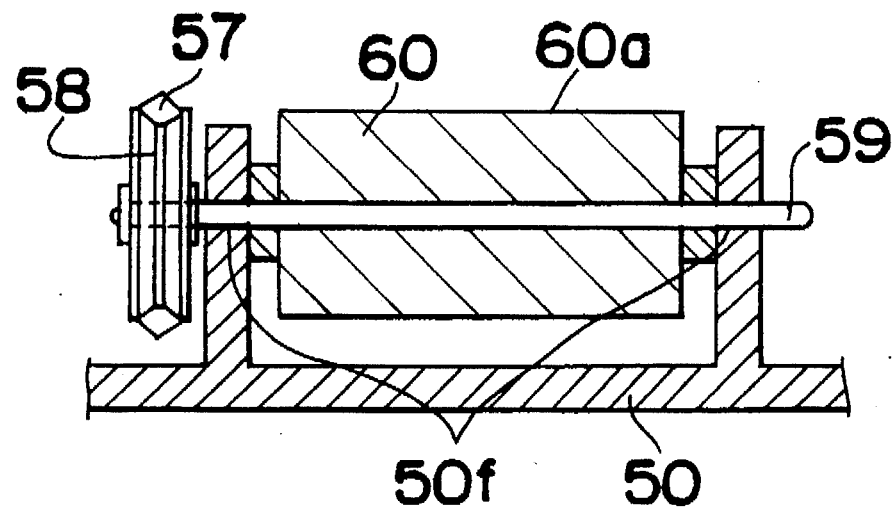

AUTOMATIC DISC CHANGER FOR RETRIEVING A LOWERMOST DISC FROM A STACK OF STORED DISCS AND RETURNING THE DISC TO THE TOP OF THE STACK

BACKGROUND OF THE INVENTION 1. (Field of the Invention)

The present invention generally relates to a disc player for reproducing information from an information carrier disc and, more particularly, to an automatic disc changer for the disc player for accommodating a plurality of information carrier discs and automatically setting them in a play position one by one to permit the disc player to reproduce information successively from the plural information carrier discs.

2. (Description of the Prior Art)

A compact disc player equipped with an automatic disc changer is currently available in the market. The disc changer incorporated in, for example, a portable CD (compact disc) radio cassette recorder available in the market is generally of a design in which a plurality of information carrier discs, that is, compact discs, are placed in a single, common plane and, therefore, includes a generally flat, intermittently rotatable rotary disc tray having a plurality of, for example, five, disc pockets defined on a circle depicted about the center of rotation of the rotary disc tray so that the compact discs can be successively brought to a play position as the rotary disc tray rotates.

The prior art disc changer referred to above will now be discussed in more detail with particular reference to FIGS. 14 to 16. FIG. 14 is an exploded view of the prior art disc changer and FIGS. 15 and 16 are cross-sectional representations taken along the lines A—A and B—B in FIG. 14, respectively.

The prior art disc changer shown in FIGS. 14 to 16 includes a generally square tray base 50 mounted on a panel chassis 51 within a changer or player housing (not shown) for movement between retracted and extended positions through a generally transversely elongated window 51a, having been guided by left and right guide ribs 51b which are fixedly mounted on the panel chassis 51 and slidingly engaged respectively in left and right guides 50a defined in left and right sides of the tray base 50. To prevent the panel chassis 51 from being floated from the panel chassis 51, left and right retainer pieces 52 are fixedly mounted on the panel chassis 51 so as to slidably overlay the left and right sides of the tray base 50, respectively. Each of the left and right retainer pieces 52 has a length so chosen that even when the tray base 50 is moved to the extended position in a direction indicated by the arrow G, respective portions of the left and right sides of the tray base 50 adjacent the rear side thereof which then remains within the player or changer housing will not float upwardly from the panel chassis 51.

The tray base 50 has a round recess defined therein so as to extend inwardly from an upper surface thereof for accommodating a rotary disc tray 53. The tray base 50 has a stud shaft 50e integrally formed therewith in coaxial relation with the center of the bottom of the round recess and also has a plurality of, for example, three roller pockets each delimited by a pair of downwardly extending walls 50d for accommodating a respective roller 54 as best shown in FIG. 15. The walls 50d of each pair have bearing holes 50i defined therein, and the corresponding roller 54 is rotatably accommodated within the roller pocket with a roller axle 54a rotatably received in the bearing holes 50i and fixed in position by a respective pawl 50c integral with the tray base 50. The rotary disc tray 53 has a center hole 53d and also has an undersurface formed with a circumferentially extending rib 53c coaxial with the center hole 53d. This rotary disc tray 53 is received within the round recess in the tray base 50 with the center hole 50d rotatably receiving the stud shaft 50e therein and with the circumferentially extending rib 53c resting on an outer peripheral surface 54b of each of the rollers 54 so that the rotary disc tray 53 can be turned in one of opposite directions, shown by the arrow-headed line C–D, about the stud shaft 50e integral with the tray base 50.

The rotary disc tray 53 is shown to have five round disc pockets 53a of a depth generally slightly smaller than the thickness of an information carrier disc, for example, a compact disc 61, defined on an upper surface thereof to occupy respective portions of a circle depicted about the center hole 53d. This rotary disc tray 53 has a generally U-shaped groove 53b cut radially inwardly from the outer periphery thereof so as to extend therefrom radially inwardly to a central portion of each disc pocket 53b. A size indicated by L1 in FIG. 15 is so chosen that none of the rollers 54 is viewable from the outside through the respective groove 53b.

A first drive motor 55 having a motor pulley 56 is mounted on the tray base 50 and is drivingly coupled with the rotary disc tray 53 for driving the latter about the stud shaft 50e. For this purpose, the rotary disc tray 53 has a geared wheel 53e integrally and coaxially formed with the undersurface thereof, which wheel 53e is with teeth 60a of a work gear 60 drivingly coupled with the motor pulley 56 through a speed reduction mechanism including an endless belt 57, a worm pulley 58 and a worm shaft 59. As best shown in FIG. 16, the work gear 60 is mounted on the worm shaft 59 under interference fit together with the worm pulley 58 with opposite ends of the worm shaft 59 rotatably received by spaced apart bearing pieces 50f integral with the tray base 50.

A second drive motor 62 is mounted on the panel chassis 51 and is drivingly coupled with the tray base 50. A rack gear 50g is rigidly secured to, or otherwise formed integrally with, the undersurface of the tray base 50 and is drivingly coupled with this second drive motor 62 through a speed reduction mechanism including a motor pulley 63, an endless belt 64, a pulley gear 65 and a drive gear 66 having teeth 66a meshed with the rack gear 50g so that the tray base 50 can be moved from the retracted position towards the extended position in a direction shown by the arrow G and from the extended position towards the retracted position in a direction shown by the arrow H depending on the direction of rotation of the second drive motor 62.

An optical pick-up unit 67 is mounted on the panel chassis 51 at a location within the player or changer housing and opposite to the elongated window 51a and includes a turntable 67a for the support from below of one of the compact discs 61 placed in the respective disc pockets 53a in the rotary disc tray 53. This optical pick-up unit 67 has stud shafts 67b protruding laterally outwardly therefrom in alignment with each other and pivotally received by respective brackets 51c, fixedly mounted on the panel chassis 51, so that the optical pick-up unit 67 can be pivoted up and down. A pin 67c carried by the optical pick-up unit 67 so as to protrude forwards rests slidingly on a cam portion 68a of an elevating gear 68 so that, when the elevating gear 68 is driven by a third drive motor 69 as will be described later, the pin 67c can be shifted upwardly or downwardly to cause the optical pick-up unit 67 to pivot in one of opposite directions shown by the arrow-headed line E and F about a common axis of the stud shafts 67b with the turntable 67c consequently lifted or lowered depending on the direction of rotation of the elevating gear 68. The third drive motor 69 is also mounted on the panel chassis 51 and has a motor pulley 70 drivingly coupled with the elevating gear 68 through a speed reduction mechanism including an endless belt 71 and a pulley gear 72.

The turntable 67a is cooperable with a clamper 73 rotatably received and retained in position within a hole 74a defined in a clamper support plate 74, which clamper 73 can pass through any one of the U-shaped grooves 53b in the rotary disc tray 53. This clamper support plate 74 is rigidly mounted on the panel chassis 51 with the clamper 73 positioned immediately above and in alignment with the turntable 67a. It is to be noted that the tray base 50 has a generally U-shaped cutout defined at 50h to accommodate the optical pick-up unit 67 when the tray base 50 is held at the retracted position having been moved in the direction H.

The prior art disc changer of the above described construction operates in the following manner. When the compact discs 61 are desired to be mounted on the rotary disc tray 53, a command necessary to move the tray base 50 to the extended position where at least two of the disc pockets 53a in the rotary disc tray 53 carried by the tray base 50 are exposed to the outside must be inputted to the disc changer in a manner known to those skilled in the art. In response to this command, the drive motor 62 is driven in one of opposite directions to drive the drive gear 66 through the speed reduction mechanism including the motor pulley 63, the endless belt 64 and the pulley gear 65 and, therefore, the tray base 50 is moved from the retracted position towards the extended position in the direction G by meshed engagement between the teeth 66a of the drive gear 66 with the rack gear 50g integral with the tray base 50. The drive motor 62 once driven is brought to a halt in response to arrival of the tray base 50 at the extended position. It is to be noted that, even when the tray base 50 is moved to the extended position, the tray base 50 does not "slouch" because, as hereinbefore described, the left and right retainer pieces 52 retain the respective portions of the left and right sides of the tray base 50 adjacent the rear side thereof which then remains within the player or changer housing.

With the tray base 50 brought to the extended position, two of the disc pockets 53a are simultaneously exposed to the outside of the disc changer and, hence, set at a loading position and, therefore, two compact discs 61 can be simultaneously placed within the respective disc pockets 53a. After the placement of the two compact discs 61 in the respective disc pockets 53a, and where additional compact discs 61 are desired to be placed in the remaining disc pockets 53a then concealed within the player or changer housing, a command necessary to drive the drive motor 55 should be inputted to the disc changer. Once this command is inputted, the drive motor 55 is driven for a preset length of time to drive the rotary disc tray 53 about the stud shaft 50e in one of the opposite directions C and D through the speed reduction mechanism, including the motor pulley 56, the endless belt 57, the worm pulley 58, the worm shaft 59 and the worm gear 60 having the teeth 60a meshed with the geared wheel 53 integral with the rotary disc tray 53, thereby bringing the other two of the remaining disc pockets 53a to the outside of the player or changer housing through the window 51a and, hence, to the loading position. Since the drive motor 55 is brought to a halt in response to turning of the rotary disc tray 53 through the predetermined angular distance, the additional two compact discs 61 can be placed in the corresponding disc pockets 53a then held at the loading position.

Thus, the rotary disc tray 53 is turned intermittently a predetermined angular distance required for each two of the disc pockets 53a to be brought to the loading position outside the player or changer housing. By repeating this procedure, all of the disc pockets 53a in the rotary disc 53 can have the corresponding compact discs 61 placed therein.

Subsequent depression of a "PLAY" button (not shown) results in generation of a start command with which the various electric component parts are sequentially operated. Namely, the drive motor 62 is reversed to rotate in the opposite direction to move the tray base 50 from the extended position towards the retracted position in the direction H. In response to arrival of the tray base 50 at the retracted position, the drive motor 55 is again driven to turn the rotary disc tray 53 in one of the opposite directions C and D about the stud shaft 50e to bring one of the disc pockets 53a and, hence, the compact discs 61 accommodated therein, to a play position immediately beneath the clamper 73. In response to arrival of one of the compact discs 62 at the play position, not only is the drive motor 55 brought to a halt, but the drive motor 69 is driven to drive the elevating gear 68 through the speed reduction mechanism including the motor pulley 70, the belt 71 and the pulley gear 72, causing the optical pick-up unit 67 to pivot upwardly about the common axis of the stud shafts 67b in the direction E. As a result of this, the turntable 67a is lifted until an inner peripheral portions of the associated compact disc 61 around a center hole thereof is clamped between the turntable 67a and the clamper 73. Shortly thereafter, in a manner known to those skilled in the art, the compact disc 61 at the play position is driven at a high speed and music recorded on the compact disc 61 is reproduced.

After the music on the compact disc 61 has been completely played, the drive motor 69 is reversed to rotate in such a direction required to pivot the optical pick-up unit 67 in the direction F with the turntable 67a consequently lowered while allowing the compact disc 61 to be seated within the disc pocket 53a, followed by the drive of the drive motor 55 to turn the rotary disc tray 53 to thereby bring the next succeeding compact disc 61 to the play position. In response to the arrival of the next succeeding compact disc 61 at the play position, the optical pick-up unit 67 is again pivoted in the direction E in a similar manner as hereinbefore described to allow an inner peripheral portion of the next succeeding compact disc 61 to be clamped between the turntable 67a and the clamper 73 in readiness for reproduction of music from such next succeeding compact disc 61.

Where the compact discs 61 within the corresponding disc pockets 53a in the rotary disc tray 53 are desired to be replaced with other compact discs or removed from the disc pockets 53a, the drive motor 69 must be driven to pivot the optical pick-up unit 67 in the direction F to lower the turntable 67a, followed by drive of the drive motor 62 to move the tray base 50 from the retracted position towards the extended position in the direction G. At the time the tray base 50 is brought to the extended position, two of the compact discs 61 are returned to the loading position and, therefore, can be removed from the associated disc pockets 53a. If desired, two different compact discs may be placed in the disc pockets 53a in the case of replacement. Complete removal of the five compact discs 61 can be accomplished by intermittently turning the rotary disc tray 53 by driving the drive motor 55 in response to a required command.

On the other hand, where some of the compact discs 61 within the corresponding disc pockets 53a in the rotary disc tray 53 are desired to be removed or replaced, a requisite command should be inputted to drive the drive motor 62 so that the tray base 50 can be moved from the retracted position towards the extended position in the direction G. Thereafter, the drive motor 55 should be driven in response to another requisite command to turn the rotary disc tray 53 until such some of the compact discs 61 desired to be removed or replaced are brought back to the loading position, and then they can be manually removed from the corresponding disc pockets 53a or replaced with different compact discs 61.

The prior disc changer of the type shown in and described with reference to FIGS. 14 to 16 has some problems. Specifically, since the prior art disc changer makes use of the generally flat, intermittently rotatable rotary disc tray having the plural disc pockets defined in a common plane, the rotary disc tray occupies a relatively large quantity of space, rendering the disc changer as a whole to be bulky in structure.

Also, in order for the disc changer to have a capability of allowing some of the compact discs to be removed or replaced while one of them is still held at the play position, the prior art disc changer requires three separate drive systems including the respective drive motors, rendering the disc changer as a whole to be complicated in structure and expensive with the necessity of use of a substantially increased number of component parts.

SUMMARY OF THE INVENTION

Accordingly, the present invention has been devised to substantially eliminate the foregoing problems inherent in the prior art disc changer and is intended to provide an improved automatic disc changer which can be assembled with a minimized number of component parts and is therefore compact in size.

To this end, the present invention provides an automatic disc changer which includes a tray storage section for accommodating a stack of disc trays each having an opening defined in a support surface thereof on which a corresponding information carrier disc is placed; an information pick-up unit disposed at a location adjoining the tray storage section and supported for movement up and down between elevated and lowered positions corresponding respectively to play and stand-by positions; a tray transport means for transporting a lowermost one of the stack of the disc trays within the tray storage section towards the stand-by position immediately above the information pick-up unit; a tray elevating means carrying the information pick-up unit and operable to elevate the disc tray at the stand-by position towards the play position; and a tray returning means for returning the disc tray at the play position back to the tray storage section and immediately above the stack of the disc trays remaining within the tray storage section.

The disc changer may include a support means for supporting the disc tray which has been lifted by the tray elevating means to the play position.

Preferably, the tray transport means includes a movable carrier movable between receiving and delivery positions for transporting the lowermost one of the stack of the disc trays towards the stand-by position, and a drive means for driving the movable carrier between the receiving and delivery positions. In this case, the tray elevating means is driven by the drive means to elevate in unison with movement of the movable carrier towards the delivery position to transport the disc tray towards the stand-by position.

Also preferably, the support means includes tray locking arms having respective pairs of the forked stays and elastically deformable in contact with a rim of the disc tray to allow the disc tray to pass thereover until the disc tray rests on the forked stays.

Furthermore, the tray returning means may preferably be constituted by an upright shoe provided on the movable carrier for pushing the disc tray from the play position back towards the tray storage section in response to return movement of the movable carrier from the delivery position towards the receiving position.

Each of the disc trays may has at least one engaging element and, in this case, the movable carrier has a corresponding counter-engaging element. The engaging and counter-engaging elements are engageable with each other to connect the lowermost one of the stack of the disc trays with the movable carrier as the movable carrier moving from the delivery position approaches the receiving position.

Preferably, the movable carrier of the tray transport means has a rack gear; the drive means includes a rack movable in a direction conforming to the direction of movement of the movable carrier, a drive rack movable in the direction conforming to the direction of movement of the movable carrier and including a spur gear assembly meshed on one hand with the rack gear and the rack, a drive motor including a speed reduction mechanism operatively associated with the drive rack, and a locking means for locking the rack at an initial position before the movable carrier being moved from the receiving position reaches the delivery position and also for locking the movable carrier at the delivery position before the rack is returned from a position aligned with the stand-by position towards the initial position; and the tray elevating means is driven by the rack.

A pivotally supported lid may be disposed above at least one of the tray storage section and the play position for facilitating a disc replacement.

The tray storage section may include a disc locking pin adapted to extend from below through respective center holes of the information carrier discs in the associated disc trays within the tray storage section.

Where the pivotally supported lid is employed, it may be provided with a disc suppressor including a plurality of pivotally supported disc chucking fingers and operable in contact with the disc locking pin, which has been passed through the center holes of the respective discs, for pressing the information carrier disc in the uppermost one of the stack of the disc trays within the tray storage section.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 14 is the exploded view of the prior art disc changer;

FIG. 15 is the cross-sectional view taken along the line A—A in FIG. 14; and

FIG. 16 is the cross-sectional view taken along the line B—B in FIG. 14.

DETAILED DESCRIPTION OF THE EMBODIMENTS

Figure 1:
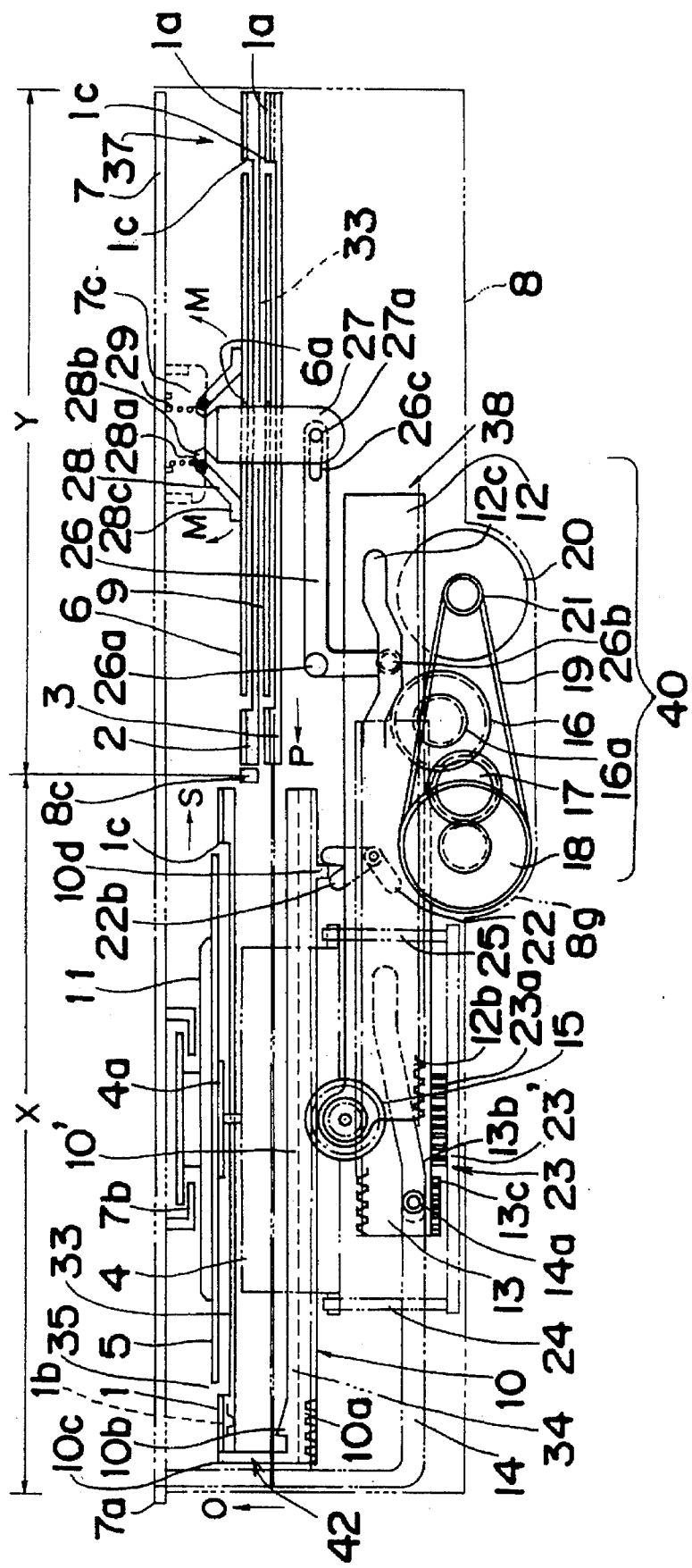
FIG. 1 is a front elevational view of a disc changer according to a first preferred embodiment of the present invention.

Referring now to FIGS. 1 to 11, there is shown an automatic disc changer according to a first preferred embodiment of the present invention. The disc changer shown therein makes use of one or more disc trays, three of which are shown by 1, 2 and 3. Since the disc trays 1 to 3 are of an identical construction, reference will be made only to the disc tray 1 in describing the details of each disc tray that can be used with the disc changer of the present invention.

The disc tray is generally in the form of a square rimmed plate of a depth slightly greater than the thickness of an information carrier disc, for example, a compact disc (identified by 5, 6 or 9 as accommodated in the disc tray 1, 2 or 3, respectively), having a round recess 1c defined therein for accommodating the respective compact disc 5, 6 or 9 and opening upwardly. This disc tray 1, 2 or 3 has a bottom formed with a generally U-shaped opening 33 to provide an access of an information pick-up unit 4 to the compact disc 5, 6 or 9 within the associated disc tray, and also has a generally square rim 1a protruding outwardly and one or two engagement recesses 1b defined in the undersurface thereof so as to be engageable with mating engagement projections 10b forming respective parts of a tray transport means 10 as will be described later.

It should be noted that instead of the engagement recesses and the mating engagement projections formed in each disc tray and the tray transport means, respectively, the engagement projections and the mating engagement recesses may be formed in each disc tray and the tray transport means, respectively. It is also to be noted that, if desired in order for the disc changer of the present invention to have a capability of accommodating not only standard compact discs (about 12 cm in diameter), but also standard mini compact discs (about 8 cm in diameter), an undersized round recess generally indicated by 2d in FIG. 2 may be formed in each disc tray 1, 2 or 3 in coaxial relation with the associated round recess 1c.

Figure 3:
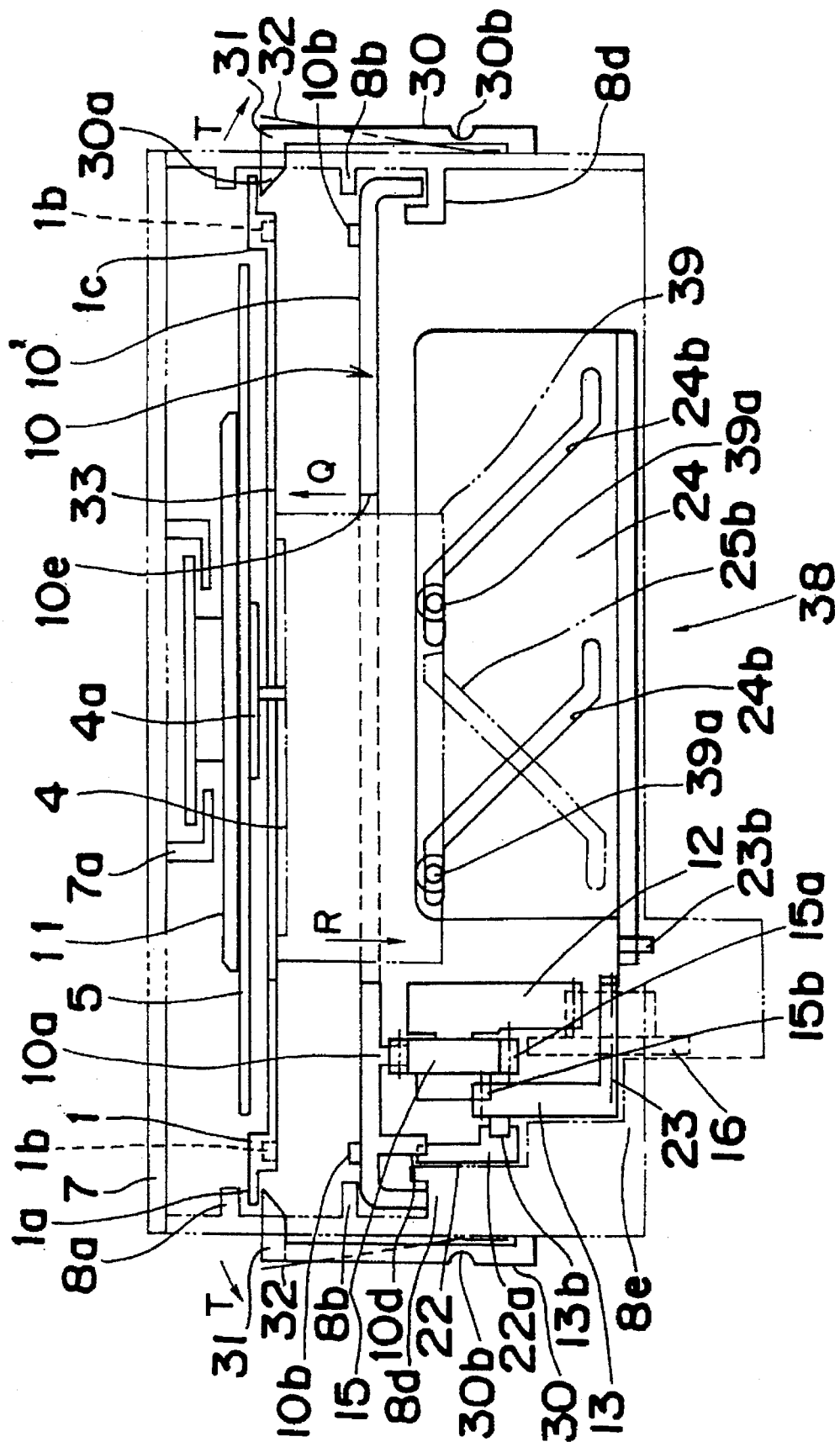
FIG. 3 is a left-hand side view, on an enlarged scale, of the disc changer shown in FIG. 1.
Figure 4:
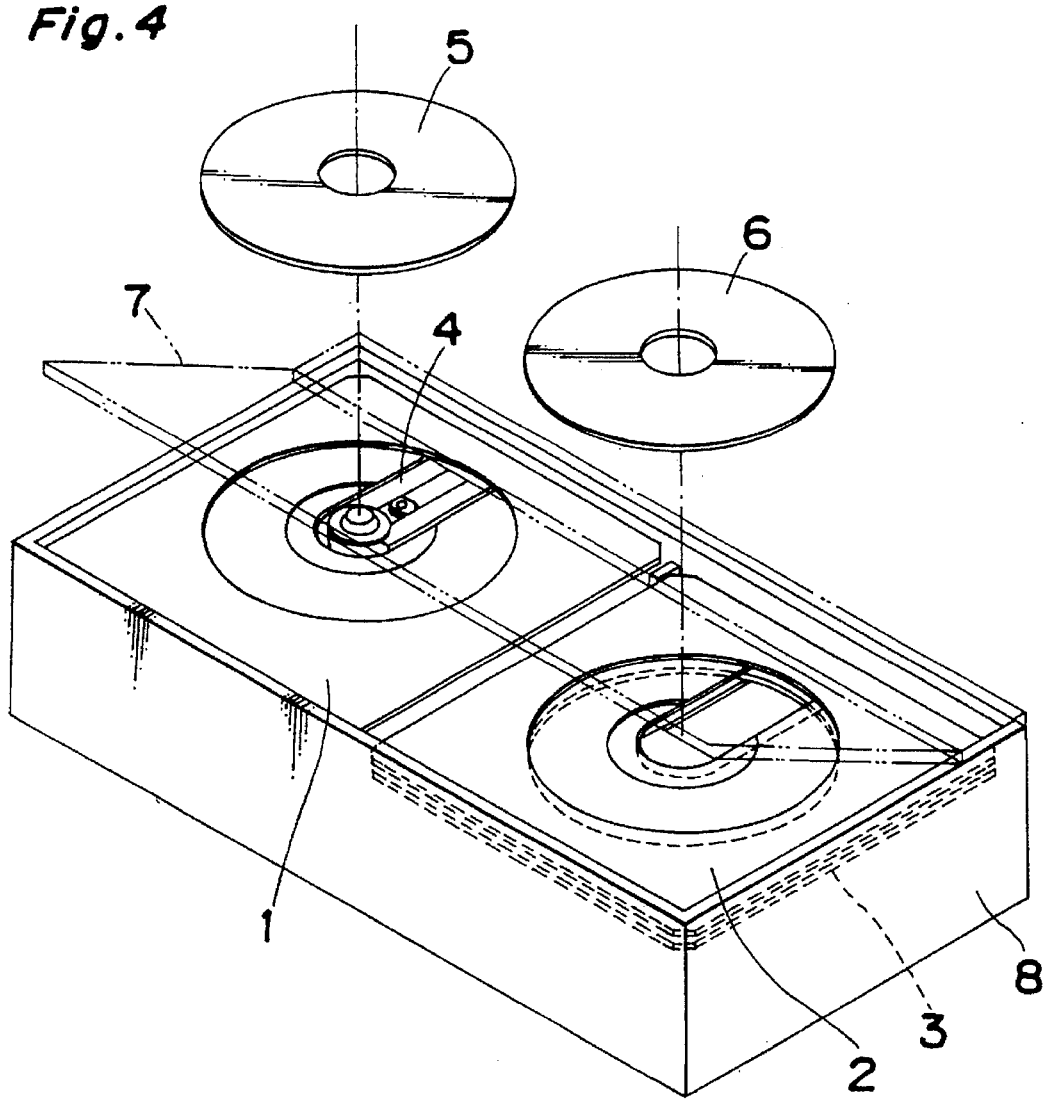
FIG. 4 is a schematic perspective view with compact discs removed from the disc changer shown in FIG. 1.
Figure 5:
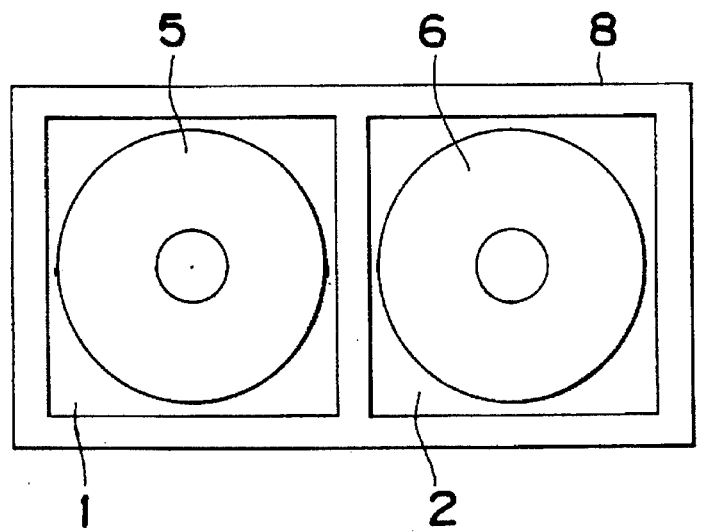
FIG. 5 is a top plan view, on a reduced scale, showing the disc changer of FIG. 1 with a lid removed.

The disc changer according to the present invention includes, as best shown in FIGS. 4 and 5, a housing 8 of a generally rectangular box-like configuration having a pivotally supported, generally rectangular lid 7 for selectively opening and closing a top opening of the housing 8. As indicated in FIG. 1, the housing 8 is generally divided into two sections, a disc play section X and a disc storage section Y, of a substantially equal size, having a disc play chamber and a tray storage chamber 37 defined therein respectively. The tray storage chamber 37 in the disc storage section Y is adapted to accommodate a plurality of disc trays (only two of which are shown by 2 and 3) in a stacked fashion. The lowermost one of the disc trays, that is, the disc tray 3, is supported within the tray storage chamber 37 by slide rails 8b integral with front and rear wall segments that form respective parts of the housing 8 and define the tray storage chamber 37 as shown in FIG. 3. The slide rails 8b extends from the tray storage chamber 37 to a position aligned with a stand-by position, indicated by 34 in FIGS. 1 and 6B, within the disc play chamber in the disc play section X so that the lowermost disc tray 3 can be moved sidewise from the tray storage chamber 37 to the stand-by position 34 in a direction shown by the arrow P.

The disc tray 2 immediately above the lowermost disc tray 3 rests on the lowermost disc tray 3 by the effect of its own weight and is retained within the tray storage chamber 37 by a stopper 8c which may be a part of a partition wall dividing the interior of the housing 8 into the disc play chamber and the tray storage chamber 37. Accordingly, even though the lowermost disc tray 3 is moved sidewise towards the stand-by position 34 as will be described later, the next adjacent disc tray 2 can be retained within the tray storage chamber 37 by the stopper 8c without being moved laterally, but may be dropped onto the slide rails 8b as will also be described later.

Figure 2:
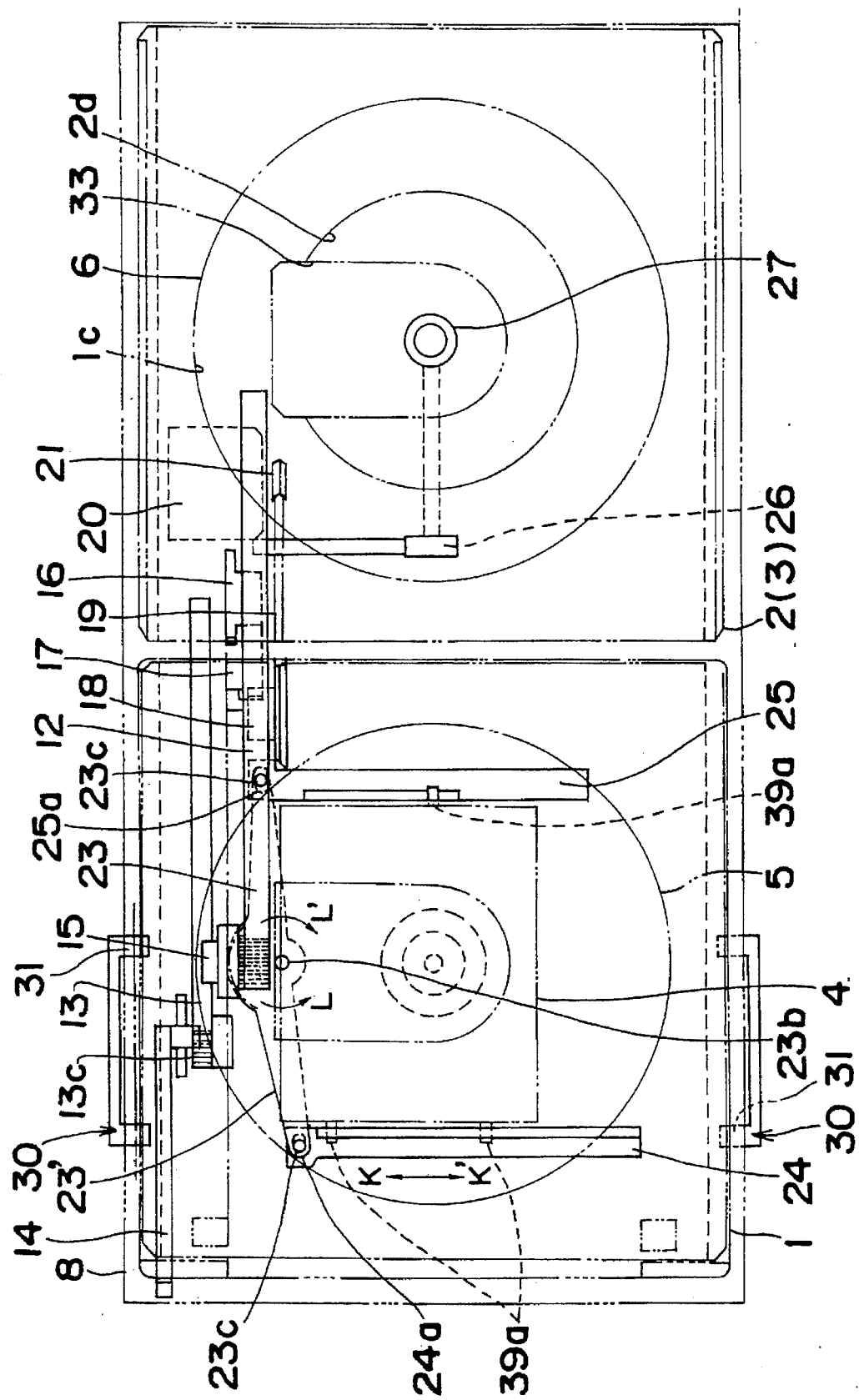
FIG. 2 is a top plan view of the disc changer shown in FIG. 1.
Figure 6A:
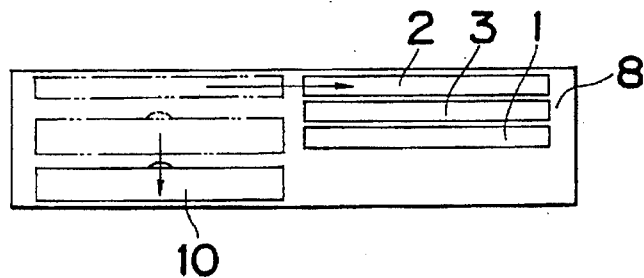
FIGS. 6A to 6B are schematic front elevations views of the disc changer of FIG. 1, illustrating how the plural compact discs are circulated past a play position within the disc changer.
Figure 6B:
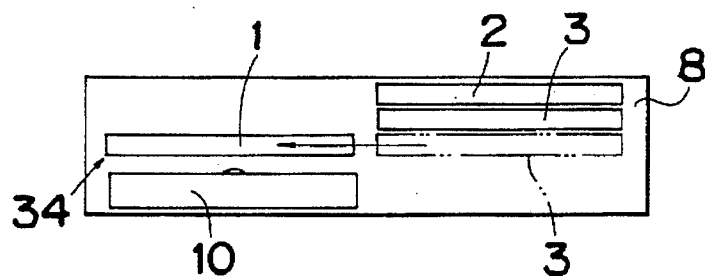
Figure 6C:
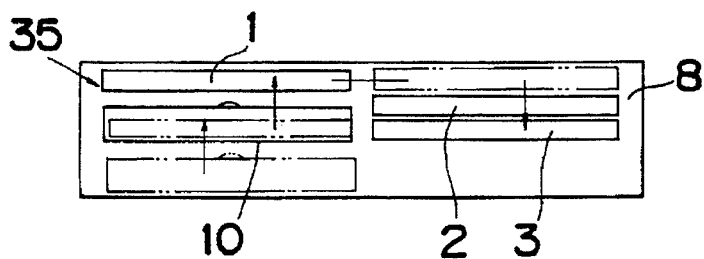

FIGS. 1 to 3 illustrates an additional disc tray 1 having been moved from the tray storage chamber 37 to the stand-by position 34 and then to a play position, indicated by 35 in FIGS. 1 and 6C, also defined within the disc play chamber of the housing 8 and immediately above the stand-by position 34. The disc tray 1 held at the play position 35 is supported by support means 30 best shown in FIGS. 2 and 3 and employed one for each side of the disc tray. Each of the support means 30 is of a design having an elasticity sufficient to yield against its own elasticity to allow the disc tray 1 to pass thereacross when the disc tray 1 is moved upwardly from the stand-by position 34 towards the play position 35 and concurrently serving as a guide when the disc tray 1 is to be returned to the tray storage chamber 37.

More specifically, as best shown in FIGS. 2 and 3, each of the support means 30 is in the form of a tray locking arm 31 extending generally vertically in a direction perpendicular to the direction of sidewise movement of the disc tray between the disc storage chamber 37 and the disc play chamber and having a lower end secured exteriorly to front and rear wall segments of the housing 8 defining the disc play chamber. Each of the tray locking arm 31 has an upper end formed into a pair of forked stays 30a and is normally biased by a respective spring element 32, secured at one end to the front or rear wall segments of the housing 8, with the forked stays 30a consequently held in position to protrude generally horizontally into the disc play chamber through a respective slot defined in the front or rear wall segment of the housing 8. A generally intermediate portion of each tray locking arm 31 is formed with a transverse groove 30b that imparts a propensity to elastically flex to the respective tray locking arm 31 and concurrently defines a hinge about which the respective tray locking arm 31 pivots between hold and release positions, the tray locking arm 31 being, however, being normally held at the hold position as biased by the associated spring element 32. It is to be noted that the forked stays 30a at the upper end of each tray locking arm 31 are spaced from each other a distance sufficient to support the disc tray from below.

Also, each of the forked stays 30a has a downwardly oriented portion so shaped and so inclined that, as the disc tray is shifted upwardly from the stand-by position 34 towards the play position 35 in a manner as will be described later, the rim 1b integral with each disc tray can slide relatively over the forked stays from below while urging the pairs of the forked stays 30a in respective directions away from each other to cause the tray locking arms 31 to pivot from the hold position towards the release position against the associated spring elements 32 about the corresponding hinges 30b, but upon arrival of the disc tray at the play position 35, the tray locking arms 31 are allowed to return to the hold position as biased by the spring elements 32 with the respective pairs of the forked stays 30a consequently protruding under the disc tray to support the latter from below. The play position 35 is defined by the pairs of the forked stays 30a in cooperation with transverse guide rails 8a integrally formed with the front and rear wall segments of the housing 8 so as to protrude into the disc play chamber at a location immediately above the associated pairs of the forked stays 30a, the transverse guide rails 8a extending within the disc play chamber in a direction widthwise of the disc changer as viewed in FIG. 1 and parallel to the slide rails 8b. As will become clear from the subsequent description, the guide rails 8a are cooperable with the pairs of the forked stays 1b to guide the disc tray to move in a direction, shown by the arrow S in FIG. 1, from the play position 35 within the disc play chamber into the tray storage chamber 37 and then onto the stack of the disc trays within the tray storage chamber 37.

The information pick-up unit 4 is supported on a tray elevating means 23 which will be described later. The information pick-up unit 4 includes a turntable 4a which during operation enters the U-shaped opening 33 in the disc tray 1, then held at the play position 35, to lift the compact disc 1 upwardly from the bottom of the disc tray 1 to thereby support it from below. This information pickup unit 4 also includes, for example, an optical pick-up head (not shown) supported for movement in a direction radially of the compact disc within the U-shaped opening 33 in the disc tray to pick up information from the compact disc in a manner well known to those skilled in the art. It is to be noted that, as will be described later, during information reading or recording performed by the optical pick-up head, the compact disc is rotated in one direction at a high speed while sandwiched between the turntable 4a and a clamper identified by 11.

The tray transport means 10 includes a movable carrier 10' for transporting the lowermost one of the stack of the disc trays within the tray storage chamber 37 towards the stand-by position 34 within the disc play chamber, and a drive means 40 for driving the movable carrier 10' between receiving and delivery positions. As shown in FIG. 3, the movable carrier 10' is slidably mounted on carrier guide rails 8d integrally formed respectively with the front and rear wall segments of the housing 8 so as to protrude into both of the disc play chamber and the tray storage chamber 37 at a location immediately below the slide rails 8b while extending within the housing 8 in a direction widthwise of the disc changer as viewed in FIG. 1 and parallel to the slide rails 8b. This movable carrier 10' so supported is movable between the receiving position, defined within the tray storage chamber 37 and immediately below the lowermost one of the stack of the disc trays, and the delivery position aligned with the stand-by position 34 within the disc play chamber. It is to be noted that the slide rails 8b on which the lowermost one of the stack of the disc trays within the tray storage chamber 37 rests and is subsequently slidingly guided towards the stand-by position 34 concurrently serve to suppress any possible upward displacement of the movable carrier 10'.

The movable carrier 10' has a rack 10a secured to or otherwise formed integrally with the undersurface thereof so as to extend in a direction parallel to the direction of movement of the movable carrier 10' and is adapted to be driven by the drive means 40 drivingly meshed with the rack gear 10a. The engagement projections 10b referred to hereinbefore are formed on an upper surface of the movable carrier 10' and positioned thereon so as to align with the mating engagement recesses 1b in each of the disc trays so that the disc tray can be transported by the movable carrier 10' with the engagement projections 10b engaged in the associated engagement recesses 1b.

As briefly described, the disc tray 1 in the play position 35 is, after information has been played back from the compact disc 5, returned to the tray storage chamber 37 with the rim 1a thereof guided between the transverse guide rails 8a and the pairs of the forked stays 30a. For this purpose, a tray returning means 42 is employed which is in the form of an upright shoe 10c formed integrally with the movable carrier 10' so as to extend perpendicular to and upwardly from one end of the movable carrier 10' so that, when the disc tray 1 within the disc play chamber is desired to be returned to the tray storage chamber 37 with the movable carrier 10' moving from the delivery position backwards to the receiving position, the disc tray 1 can be pushed by the upright shoe 10c to move towards the tray storage chamber 37 with the rim 1b slidingly guided between the transverse guide rails 8a and the pairs of the forked stays 30a. During this movement of the movable carrier 10' from the delivery position back to the receiving position, the disc tray 1 does not rest on the movable carriage 10' and is floated above the movable carriage 10' with only the upright shoe 10c held in contact therewith. Once the movable carrier 10' has been moved back to the receiving station, the movable carrier 10' is ready to transport the lowermost one of the disc trays, that is, the disc tray 2, within the tray storage chamber 37 towards the stand-by position 34 with the engagement projections 10b engaged in the mating engagement recesses 1b.

The drive means 40 for driving the movable carrier 10' includes a rack 13 having teeth formed on only one of opposite sides thereof and operable to drive the tray elevating means 23, as will be described later, in a direction conforming to the direction of movement of the movable carrier 10', a drive rack 12 movable in a direction conforming to the direction of movement of the movable carrier 10' and having gear teeth 12b, a spur gear assembly 15 mounted on the drive rack 12 and including teeth 15a meshed with the rack gear 10a fast with the movable carrier 10' and, also, teeth 15b meshed with the rack 13, a drive motor 20 having a speed reduction mechanism drivingly coupled with the drive rack 12, and a locking means 22 operable to lock the rack 13 at a return position until the movable carrier 10' is moved from the receiving position to the delivery position aligned with the stand-by position 34 and also to lock the movable carrier 10' at the delivery position until the rack 13 is returned from a position aligned with the stand-by position 34 to the return position.

The drive rack 12 is supported by slide guides (not shown) of the housing 8 while the rack 13 is slidably supported by a slide guide 8e which may be a part of the bottom of the housing 8, both of said racks 12 and 13 being movable in one of the opposite directions indicated by the arrow S and P, respectively. Since the teeth 15a of the spur gear assembly 15 are meshed with the rack gear 10a fast with the movable carrier 10', and assuming that the rack 13 is held still, movement of the drive rack 12 results in movement of the movable carrier 10' between the receiving and delivery positions. On the other hand, since the teeth 15b of the spur gear assembly 15 are meshed with the rack 13, and assuming that the movable carrier 10' is held still, movement of the drive rack 12 results in movement of the rack 13. In such case, since the locking means 22 serves to retain the rack 13 at the return position until the movable carrier 10' is moved from the receiving position towards the delivery position, the movable carrier 10' being so moved towards the delivery position transports the lowermost one of the disc trays within the tray storage chamber 37 towards the stand-by position and, upon arrival of the movable carrier 10' at the delivery position with the disc tray consequently brought to the stand-by position 34, the lock means 22 releases the rack 13 to permit the latter to move at any time. Also, this locking means 22 also serves to retain the movable carrier 10' at the delivery position until the rack 13 is moved from a position aligned with the stand-by position 34 towards the return position, the movable carrier 10' is unable to return to the receiving position before the arrival of the rack 13 at the return position and can be moved back to the receiving position only after the rack 13 has been moved to the return position.

Figure 7:
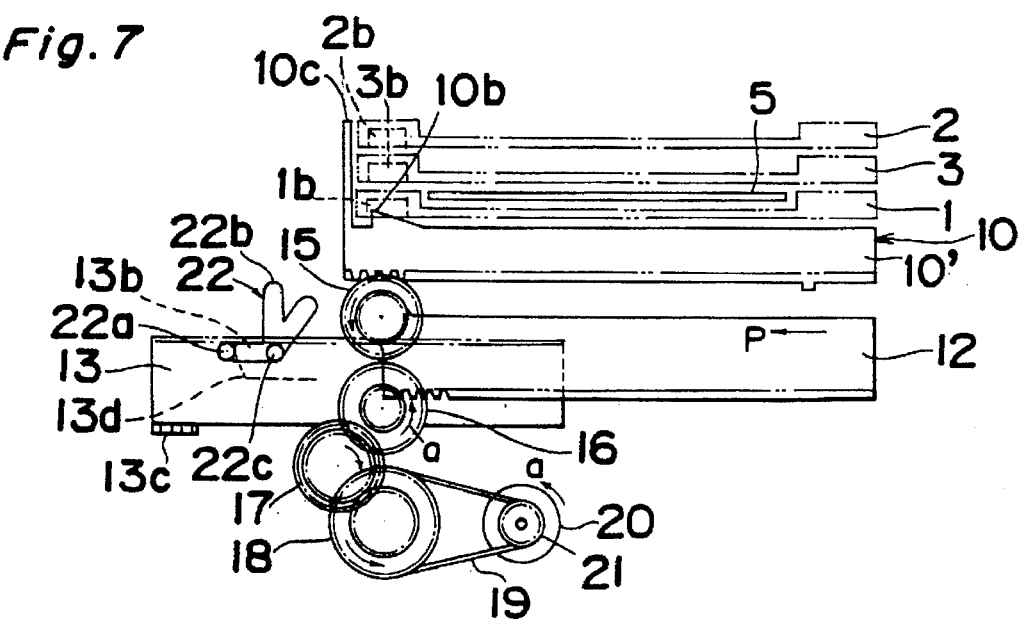
FIG. 7 is a fragmentary front elevational view of a disc storage section of the disc changer of FIG. 1 with a tray transport means positioned therebelow.

The details of the locking means 22 will now be described with particular reference to FIG. 7. As shown therein, the locking means 22 includes an axle 22c rotatably connected to the front wall segment of the housing 8, a pin portion 22a engageable with a lock receiving slot 13b defined in the rack 13, and a pair of forked fingers 22b engageable with a lock operating piece 10d integrally formed with the movable carrier 10' so as to extend downwardly from the undersurface thereof. In a condition in which the movable carrier 10' is held at the receiving position as shown in FIG. 7, the pin portion 22a of the locking means 22 is engaged with one end of the lock receiving slot 13b to lock the rack 13, that is, to inhibit movement of the rack 13 in the direction shown by the arrow P while permitting the movable carrier 10' to be ready to move towards the delivery position. Because of this, when the drive rack 12 is moved in the direction P, the spur gear assembly 15 is rotated with the teeth 15b meshed with the rack 13 and, therefore, rotation of the spur gear assembly 15 is transmitted to the movable carrier 10' through meshed engagement between the teeth 15a and the rack gear 10a, causing the movable carrier 10' to move towards the delivery position.

Figure 8:
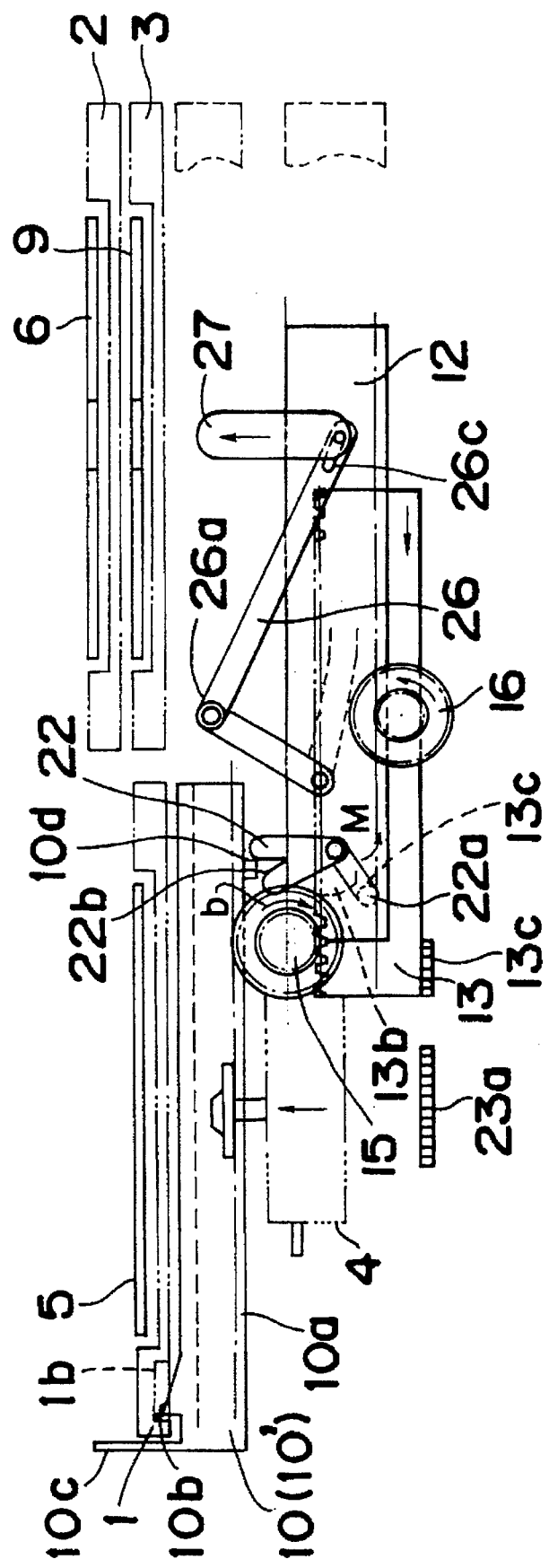
FIG. 8 is a fragmentary front elevational view of the disc changer with a tray of the disc storage section held at a stand-by position.

Upon arrival of the movable carrier 10' at the delivery position with the lowermost one of the disc trays consequently brought to the stand-by position 34 as shown in FIG. 8, the forked fingers 22b of the locking means 22 are pushed by the lock operating piece 10d integral with the movable carrier 10' with the locking means 22 consequently pivoted in a counterclockwise direction, shown by the arrow M, about the axle 22c with the pin portion 22a disengaging from that end of the lock abutment 13b and brought into sliding contact with a lower edge 13c defining a part of the lock receiving slot 13b. For this reason, the rack 13 is released from the locking means 22 in readiness for movement thereof in the direction P, an actual movement of the rack 13 in the direction P taking place when the movable carrier 10' is brought into contact with a stopper integral with the housing 8 to halt at the delivery position and the spur gear assembly 15 is consequently reversed.

On the other hand, since the pin portion 22a is guided along the lower edge 13c of the lock receiving slot 13b in the rack 13 during movement of the drive rack 12 in a direction counter to the direction P, the locking means 22 is unable to return to the initial position and, because of this, the movable carrier 10' is locked in position with the operating piece 10d held in abutment with the forked fingers 22b, but the rack 13 can return to the return position. Upon complete return of the rack 13 to the initial position defined by a stopper of the housing 8, and since at this time the drive rack 12 is moving in the same direction as the direction of return of the rack 13, the spur gear assembly 15 is reversed to permit the movable carrier 10' to move in such direction and, since at this time the pin portion 22a of the locking means 22 is brought to that end of the lock receiving slot 13b as shown in FIG. 8 when the rack 13 is held at the return position, the locking means 22 pivots about the axle 22c in contact with the lock operating piece 10d integral with the movable carrier 10' to such a position as shown in FIG. 7, thereby permitting the movable carrier 10' to return to the receiving position within the tray storage chamber 37.

The movable carrier 10' is driven by the drive rack 12 with the spur gear assembly 15 rigid with the drive rack 12 meshed with the rack gear 10a integral with the movable carrier 10' as hereinbefore described. In the practice of the first preferred embodiment of the present invention, the number of the teeth 15a of the spur gear assembly 15 that are meshed with the rack gear 10a is so chosen that a single complete rotation of the spur gear assembly results in movement of the movable carrier 10' over a distance that is about three times the distance of movement of the drive rack 12. In a similar manner, the number of the teeth 15b of the spur gear assembly 15 that are meshed with the rack 13 is so chosen that the single complete rotation of the spur gear assembly 15 results in movement of the rack 13 over a distance that is about ⁴⁄₃ of the distance of movement of the drive rack 12.

The speed reduction mechanism intervening between the drive motor 20 and the drive rack 12 includes a motor pulley 21 mounted on a drive shaft of the drive motor 20 for rotation together therewith, an endless drive belt 19, a pulley gear 18 and an intermediate gear 17. The intermediate gear 17 is meshed with a drive gear 16 having teeth 16a which are in turn meshed with the gear teeth 12b of the drive rack 12 to drive the latter. Both of the drive motor 20 and the speed reduction mechanism are mounted in a cavity 8e defined in the bottom of the housing 8.

Reference will now be made to the tray elevating means 23. This tray elevating means 23 is operable to lift the disc tray 1, which has been brought to the stand-by position 34, to the play position 35 within the disc play chamber and is operatively associated with movement of the movable carrier 10' to the delivery position. As best shown in FIGS. 1 to 3, the tray elevating means 23 includes a translator lever 23', generally elongated slide plates 24 and 25, and an elevator 39 on which the information pick-up unit 4 is mounted. The translator lever 23' has a generally intermediate portion mounted rotatably on a pivot shaft 23b secured to the bottom of the housing 8 and also has a gear wheel 23a fixedly mounted thereon in coaxial relation with the pivot shaft 23b, the gear wheel 23a meshes with a predetermined length of teeth 13c formed in the rack 13. Thus, it will readily be seen that movement of the rack 13 results in pivotal motion of the translator lever 23' in one of opposite directions, shown by the respective arrows L and L', about the pivot shaft 23b as shown in FIG. 2.

The elongated slide plates 24 and 25 are mounted on the bottom of the housing 8 so as to extend substantially perpendicular to the direction of movement of the rack 13 and are movable in one of opposite directions, shown by the respective arrows K and K', perpendicular to the direction of movement of the rack 13. These elongated slide plates 24 and 25 are spaced from each other a distance corresponding to the length of the translator lever 23' and pivotally connected at one end to the opposite ends of the translator lever 23' by means of respective pins 23b loosely engaged in slots 24a and 25a defined in the opposite ends of the translator lever 23'. Accordingly, if the translator lever 23' is pivoted in the direction L as a result of movement of the rack 13 in, for example, the direction P, the elongated slide plates 24 and 25 are moved in respective directions K' and K opposite to each other.

The elongated slide plate 24 is formed with a pair of parallel cam grooves 24b of an identical configuration which are inclined at a predetermined angle, for example, about 40°, relative to the longitudinal sense of the elongated slide plate 24. However, opposite end portions of each cam groove 24b extend parallel to the longitudinal sense of the elongated slide plate 24. Similarly, the elongated slide plate 25 is formed with a cam groove 24b having its opposite end portions extending parallel to the longitudinal sense of the elongated slide plate 25, a substantially intermediate portion thereof being inclined at a predetermined angle, for example, about 40°, relative to the longitudinal sense of the elongated slide plate 25, but in a sense opposite to the direction of inclination of each of the parallel cam grooves 24b in the elongated slide plate 24.

Figure 9:
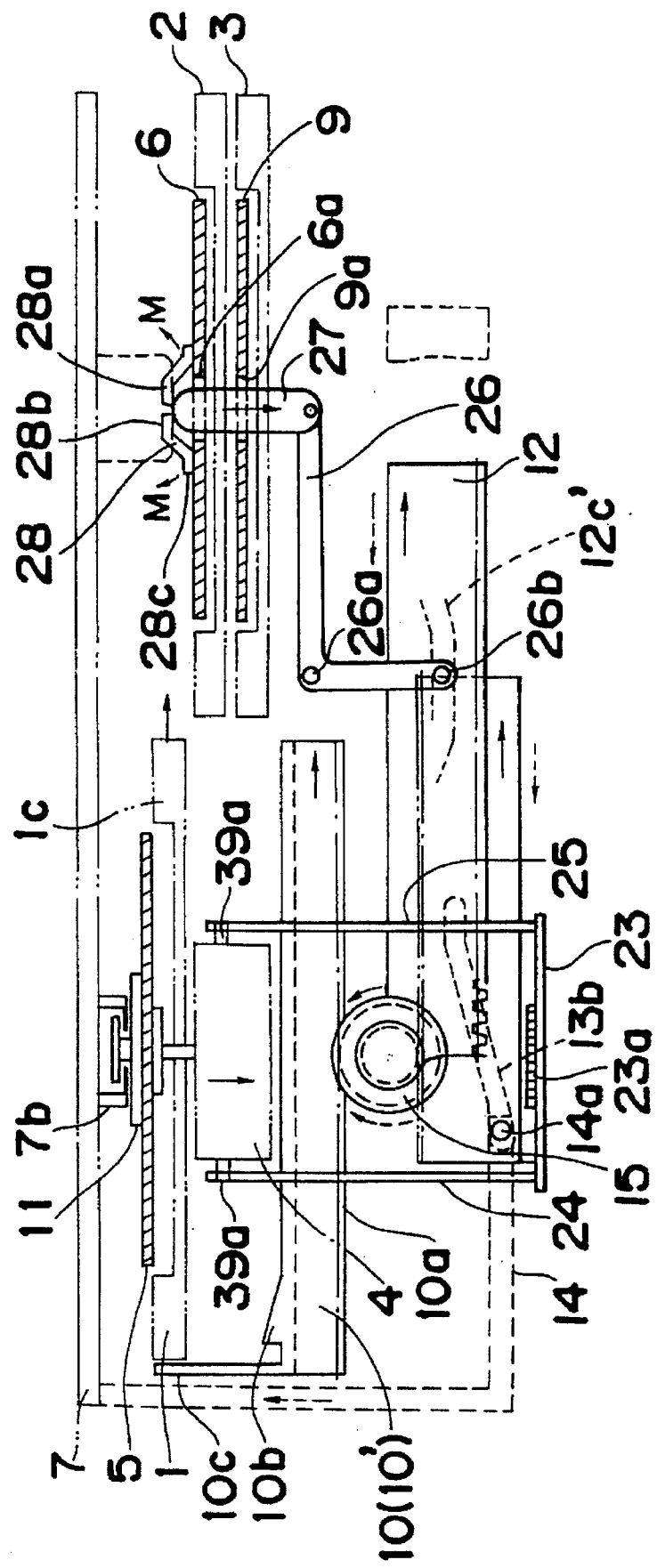
FIG. 9 is a fragmentary front elevational view of the disc changer with the tray shown as elevated to the play position.

The elevator 39 has pins 39a fixed two to one side of the elevator 39 and one to the opposite side of the elevator 39. This elevator 39 is positioned between the elongated slide plates 24 and 25 with the pins 39a movably engaged in the cam grooves 24b in the elongated slide plate 24 and the cam groove 25b in the elongated slide plate 25 for movement up and down through a through-hole 10e, defined in the movable carrier 10', of a size sufficient to allow the elevator 39 to pass therethrough. This elevator 39 is held at an elevated position, as shown in FIGS. 3 and 9, when consequent upon movement of the elongated slide plates 24 and 25 in the respective directions K' and K the elevator is upwardly shifted with the pins 39a engaged in the respective upper end portions of the cam grooves 24b and 25b as best shown in FIG. 3, but is held at a lowered position when consequent upon movement of the elongated slide plates 24 and 25 in the opposite directions K and K', respectively, the elevator is shifted downwardly with the pins 39b engaged in the respective lower end portions of the cam grooves 24b and 25b.

Accordingly, it will readily be understood that when the movable carrier 10' of the tray transport means 10 arrives at the delivery position, accompanied by movement of the rack 13, the translator lever 23' is pivoted counterclockwise about the pivot shaft 23b as viewed in FIG. 2, the elevator 23 is brought to the elevated position. It will also be clear that, since the disc tray transported to the stand-by position 34 by the movable carrier 10' then arriving at the delivery position rests on or above the information pick-up unit 4 with the turntable 4a aligned with the center hole of the compact disc, upward shift of the elevator 23 towards the elevated position results in a corresponding lift of the disc tray from the stand-by position 34 towards the play position 35 with the elevator 23 moving through the through-hole 10e in the movable carrier 10'. As discussed hereinbefore, the disc tray so brought to the play position 35 is supported in position by the support means 30, It is again pointed out that, when the movable carrier 10' at the delivery position is to move backwards to the receiving position, the upright shoe 10c of the drive means 40 pushes the disc tray in the play position 35 towards the tray storage chamber 37 and then onto the stack of the disc trays within the tray storage chamber 37.

In the illustrated embodiment, the pivotally supported lid 7 is automatically brought to one of closed and open positions and is, for this purpose, linked with a drive lever 14 of a generally L-shaped configuration including upright and transverse arms perpendicular to each other. As shown in FIG. 9, a free end of the transverse arm of the drive lever 14 carries a pin 14a that is received within a generally Z-shaped cam groove 13b defined in the rack 13. Accordingly, when the rack 13 moves in the direction P from a position at which the teeth 13c of the rack 13 once engaged with the gear wheel 23a fast with the translator lever 23' have moved past the gear wheel 23a, the drive lever 14 as a whole can be upwardly shifted with the pin 14a guided upwardly within and along the Z-shaped cam groove 13b. The pivotally supported lid 7 is brought to the open position in response to the upward shift of the drive lever 14. Thus, the pivotally supported lid 7 can be opened when one of the disc trays is held at the play position 35 and, therefore, the compact disc 5 in the disc tray 1 held at the play position 35 can be replaced with a different compact disc. Closure of the pivotally supported lid 7 can be accomplished when the rack 13 is moved in a direction counter to the direction P, accompanied by lowering of the drive lever 14 with the pin 14a guided downwardly within and along the Z-shaped cam groove 13b in the rack 13.

A portion of an interior surface of the pivotally supported lid 7 immediately above the turntable 4a is provided with an annular hook 7b loosely holding a clamper 11 that is cooperable with the turntable 4a to clamp a peripheral lip region of the compact disc around the center hole in any known manner when the pivotally supported lid 7 is closed.

Referring particularly to FIGS. 1, 2 and 8 to 10, reference numeral 27 represents a disc locking pin disposed within the tray storage chamber 37. This disc locking pin 27 extends from below through center holes 6a and 9a of the respective compact discs 6 and 9 in the associated disc trays 2 and 3, stacked within the tray storage chamber 37, by way of the U-shaped openings 33 in the disc trays 2 and 3, only when the pivotally supported lid 7 is closed, that is, during reproduction of information from the compact disc 5 in the disc tray 1 at the play position or at any time other than the time of disc replacement or opening of the pivotally supported lid 7. This disc locking pin 27 is operatively linked with the drive rack 12 through a disc locking lever 26 of a generally L-shaped configuration. The disc locking lever 26 has generally downwardly and transversely extending arms and is pivotally supported by the wall segment of the housing 8 through a boss 26a extending rotatably through a joint between the downwardly and transversely extending arms of the disc locking lever 26. A free end of the transversely extending arm of the disc locking lever 26 is formed with a longitudinal slot 26c in which a pin 27a rigid with the disc locking pin 27 is loosely received. A free end of the downwardly extending arm of the disc locking lever 26 has a pin 26b secured thereto, which pin 26b is loosely engaged in a generally downwardly rounded cam groove 12c defined in the drive rack 12.

The cam groove 12c in the drive rack 12 is so shaped as to permit the disc locking pin 27 to be held at a downwardly shifted position, as shown in FIG. 8, so long as the drive rack 12 is held at a right position, to be upwardly shifted as the drive rack 12 moves from the right position towards a left position as shown in FIG. 9 and to be shifted downwardly when the drive rack 12 arrives at the left position. Thus, it will readily be seen that when the disc locking pin 27 is upwardly shifted in response to the leftward movement of the drive rack 12, the disc locking pin 27 projects into the center holes of the respective discs through the U-shaped openings 33 in the disc trays within the tray storage chamber 37 and this occurs when the movable carrier 10' is brought to the delivery position with the pin 26b rigid with the disc locking lever 26 then engaged in the lowest portion of the cam groove 12c in the drive rack 12 as shown in FIG. 9.

With the disc locking pin 27 protruding through the center holes of the compact discs by way of the U-shaped openings 33 in the disc trays then stacked within the tray storage chamber 37, any possible departure of one or more of the compact discs from the associated round recesses 1c in the disc trays or any possible lateral displacement of the mini compact discs within the round recesses 1c and off from the associated undersized round recesses 2d, which would occur as a result of an external vibration applied to the housing 8, can be advantageously suppressed.

Also, the disc changer embodying the present invention has a disc suppressor for suppressing the compact disc accommodated in the uppermost one of the stack of the disc trays within the tray storage chamber 37 to thereby avoid any possible toss thereof. This disc suppressor in the illustrated embodiment comprises a plurality of disc chucking fingers 28 pivotally connected at an upper end thereof through respective spindles 28a with a generally annular finger holder 7c, secured to the interior surface of the pivotally supported lid 7, so as to depend downwardly therefrom. The disc chucking fingers 28 are normally biased by a coil spring 29, housed within the finger holder 7c so as to act on respective upper ends 28b thereof, to allow respective touch ends 28c of the disc chucking fingers 28 to be radially outwardly flared in a direction, indicated by the arrow M, to thereby disengage from the compact disc in the uppermost disc tray. However, when the disc locking pin 27 being shifted upwardly through the center holes of the compact discs protrudes into the finger holder 7c pushing the upper ends 28b of the disc chucking fingers 28 upwardly against the coil spring 29 substantially as shown in FIG. 1, the disc chucking fingers 28 are pivoted radially inwardly in a direction counter to the direction M with the touch ends 28c consequently brought into contact with and, hence, held in position to apply a pressing force to, the compact disc 6 in the uppermost disc tray 2 within the tray storage chamber 37.

The disc changer according to the first preferred embodiment of the present invention operates in the following manner.

When starting from the condition shown in FIG. 7 a "PLAY" command is issued so that information can be played back from the compact disc, the drive motor 20 is driven in a direction shown by the arrow a to drive the drive gear 16 in a direction shown by the arrow a through the speed reduction mechanism including the motor pulley 21, the endless drive belt 19, the pulley gear 18 and the intermediate gear 17. Rotation of the drive gear 16 in the direction a results in movement of the drive rack 12 in the direction P, accompanied by a corresponding movement of the movable carrier 10' of the tray transport means 10. At this time, the rack 13 meshed with the teeth 15b of the spur gear assembly 15 is locked in position by the locking means 22.

Since at the time the movable carrier 10' moves towards the delivery position in the direction P the engagement projections 10b integral with the movable carrier 10' are engaged in the respective engagement recesses 1a in the lowermost one of the stack of the disc trays 2 and 3 within the tray storage chamber 37, the lowermost disc tray with the corresponding compact disc accommodated therein is transported towards the stand-by position 34 as shown by 1 in FIG. 8. Departure of the lowermost disc tray out of the tray storage chamber 37 allows the remaining disc trays within the tray storage chamber 37 to fall downwardly by their own weight.

Shortly before the movable carrier 10' transporting the disc tray towards the stand-by position 34 arrives at the delivery position aligned with the stand-by position 34, the lock operating piece 10d fast with the movable carrier 10' is brought into engagement with the forked fingers 22b of the locking means 22, causing the latter to pivot in the counterclockwise direction M to release the rack 13 from being locked. Upon arrival of the movable carrier 10' at the delivery position with the disc tray consequently brought to the stand-by position 34, the spur gear assembly 15 is reversed to rotate in a direction, shown by the arrow b, as a result of movement of the drive rack 12 in the direction P, thereby driving the rack 13 in the direction conforming to the direction of movement of the drive rack 12.

Consequent upon further movement of the rack 13 in the direction P from the condition shown in FIG. 8 to the condition shown in FIG. 9, the teeth 13c of the rack 13 are brought into engagement with the gear wheel 23a fast with the translator lever 23' of the tray elevating means 23 and, therefore, the translator lever 23' is pivoted in the direction L shown in FIG. 2. Because of this, the slide plates 24 and 25 both drivingly linked with the translator lever 23' are moved in the respective directions K' and K opposite to each other. As a result of these movement of the slide plates 24 and 25, the guide pins 39a fast with the elevator 39 having the information pick-up unit 4 mounted thereon are guided diagonally upwardly along the cam grooves 24b and 25b in the respective slide plates 24 and 25 with the elevator 39 consequently elevated in a direction shown by the arrow Q. At this time, the disc tray 1 resting on the information pick-up unit 4 is also shifted upwardly together with the elevator 39.

As the disc tray 1 is upwardly shifted together with the elevator 39, the rim 1a of the disc tray 1 relatively slides over the forked stays 30a of the tray locking arms 31 while causing the latter to pivot about the respective hinges 30b towards the release position, followed by immediate return of the locking arms 31 to the hold position by the effect of the spring elements 32 with the pairs of the forked stays 30a consequently supporting the disc tray 1 from below at the play position 35. Simultaneously therewith, the turntable 4a of the information pick-up unit 4 enters the U-shaped opening 33 in the disc tray 1 to support the compact disc 5 from below and subsequently urges it against the clamper 11 carried by the pivotally supported lid 7, resulting in the compact disc 5 sandwiched between the turntable 4a and the clamper 11 as shown in FIG. 9. Since at this time the disc tray 1 is supported on the support means 30, that is, the pairs of the forked stays 30a, and if the motor 20 is reversed with no play-back being performed, the tray elevating means 23 can be lowered to return the information pick-up unit 4 back to a stand-by position.

While the disc tray 1 is held at the play position 35, the disc locking lever 26 is pivoted counterclockwise about the boss 26a with the pin 26b slidingly guided within and along the cam groove 12c in the drive rack 12, resulting in upward shift of the disc locking pin 27 to protrude through the center holes 9a and 6a of the respective compact discs 9 and 6 by way of the U-shaped openings 33 in the disc trays 3 and 2 within the tray storage chamber 37, thereby suppressing any lateral displacement of the compact disc and/or the associated disc trays.

It is to be noted that shortly before the disc locking pin 27 is completely shifted upwardly, the upper end of the disc locking pin 27 protrudes into the annular finger holder 7c, pushing the upper ends 28b of the respective disc chucking fingers 28 against the coil spring 29, causing the disc chucking fingers 28 to pivot about the spindles 28a in the direction counter to the direction M with the touch ends 28c consequently brought in position to press the compact disc 6 in the uppermost disc tray 2.

If a command necessary to open the pivotally supported lid 7 is issued while the compact disc is being played back or is held in position ready to be played back within the disc play chamber, the motor 20 is driven to move the rack 13 further in the direction P in a manner as hereinabove described to assume the condition shown in FIG. 10. At this time, since the pin 14a carried by the drive lever 14 is guided within and along the Z-shaped cam groove 13b in the rack 13, the drive lever 14 is upwardly moved in a direction shown by the arrow O in FIG. 1, to push the pivotally supported lid 7 to open the latter. With the pivotally supported lid 7 so opened, the compact disc 5 in the disc tray 1 held at the play position 35 can be removed therefrom or replaced with a different compact disc or a mini compact disc.

Figure 10:
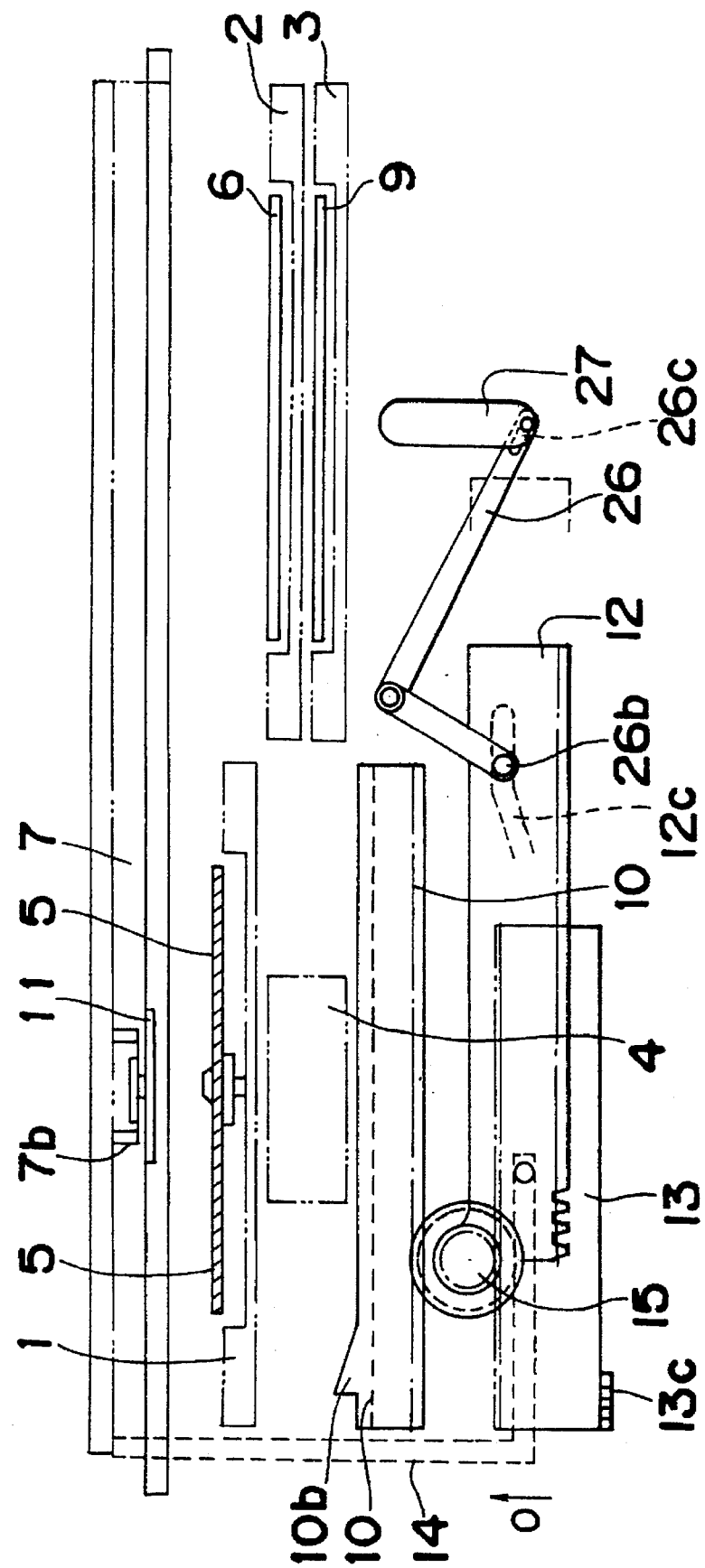
FIG. 10 is a fragmentary front elevational view of the disc changer showing how the lid is opened.
Figure 11:
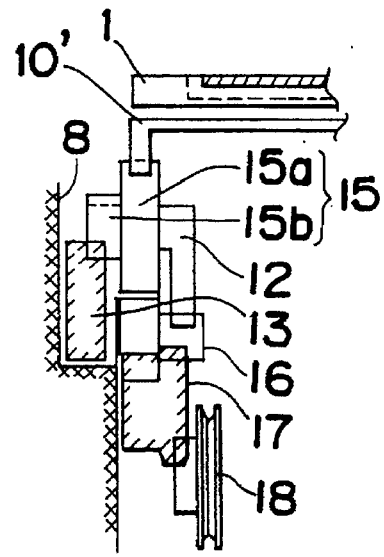
FIG. 11 is a fragmentary side sectional view of the drive means used in the disc changer.

When a command is issued to reverse the drive motor 20 while the pivotally supported lid 7 is opened, the drive rack 12 is driven rightwards as viewed in FIGS. 9 and 10 to assume the condition shown in FIG. 9, accompanied by a corresponding movement of the rack 13 in the direction counter to the direction P and, therefore, the drive lever 14 is lowered to close the pivotally supported lid 7. Further movement of the drive rack 12 in the direction counter to the direction P accompanied by the corresponding further movement of the rack 13 results in engagement of the teeth 13c of the rack 13 with the gear wheel 23a fast with the translator lever 23' to cause the latter to pivot in the direction L'. As the translator lever 23' is pivoted in the direction L', the slide plates 24 and 25 are moved in the respective directions K' and K, respectively, with the elevator 39 consequently lowered and, therefore, only the elevator 39 with the information pick-up unit 4 thereon is lowered while the disc tray 1 is left as supported at the play position 35 by the support means 30.

Continued movement of the drive rack 12 in the direction counter to the direction P to establish the condition shown in FIG. 8, the rack 13 is brought to a halt and locked at the initial position by the locking means 22, at which time the pin portion 22a of the locking means 22 is brought to the end of the lock receiving slot 13b, permitting the locking means 22 to pivot and, at the same time, allowing the forked fingers 22b of the locking means 22 to engage the lock operating piece 10d to cause the pin portion 22a to be engaged in that end of the lock receiving slot 13b. After the rack 13 has been so locked, continued movement of the drive rack 12 in the direction counter to the direction P results in reversion of the spur gear assembly 15 to move the movable carrier 10' towards the receiving position in the direction counter to the direction P. As the movable carrier 10' is so moved towards the receiving position, the upright shoe 10c integral with the movable carrier 10' and forming the tray returning means 42 pushes the disc tray 1 to slide along the tray locking arm 31 in the direction S and then onto the tray storage chamber 37.

In this way, the disc tray 1 once brought to the play position 35 within the disc play chamber is returned to the tray storage chamber 37 and then falls onto the stack of the disc trays within the tray storage chamber 37. The lowermost one of the stack of the disc trays, that is, the disc tray 3, is then mounted onto the movable carrier 10' with the engagement projections 10b engaged in the mating engagement recesses 1b in the lowermost disc tray 3 in readiness for the next cycle of tray transport.

Thus, it will readily be seen that the lowermost one of the disc trays within the tray storage chamber 37, which is now indicated by 1 in FIG. 6A, is first transported by the tray transport means 10 to the stand-by position 34 within the disc play chamber as shown in FIG. 6B, then elevated by the tray elevating means 23 to the play position 35 as shown in FIG. 6C and finally returned by the tray returning means 42 from the play position 35 to a position immediately above the stack of the remaining disc trays within the tray receiving chamber 37 as shown in FIG. 6A, while depicting a generally rectangular path. At the play position 35 shown in FIG. 6C, the compact disc in the disc tray 1 can be played or replaced with a different compact disc or a mini compact disc.

Thus, according to the present invention, it is clear that, as compared with prior art disc changer in which the compact discs are laid in a common plane as received within the respective disc pockets in the rotary disc tray, the disc changer of the present invention can be made compact in size since the compact discs are stacked as accommodated in the respective disc trays. Moreover, since the disc changer according to the present invention is so designed and so structured that any one of the stack of the disc trays travels along the generally rectangular path from a lower portion of the tray storage chamber 37 back to an upper portion of the tray storage chamber 37 past the stand-by position 34 and then past the play position 35, the structure of the tray storage chamber 37 and the structure necessary to accomplish removal and return the lowermost one of the stack of the disc trays from and back to the tray storage chamber 37 can be simplified.

The provision of the support means 30 for supporting the disc tray at the play station once it has been lifted by the tray elevating means 23 to such play station makes it possible for the tray elevating means 23 to be subsequently lowered independently of the support means 30 and, also, elevation of the tray elevating means 23 makes it possible for the compact disc to be supported on the information pick-up unit 4. Therefore, not only can the structure be simplified, but replacement or removal of the compact disc from the disc tray then held at the play position can easily be accomplished.

Also, according to the present invention, the tray transport means 10 includes the movable carrier 10' for transporting the lowermost one of the stack of the disc trays within the tray storage chamber 37 towards the stand-by position 34, and the drive means 40 for driving the movable carrier 10'. The tray elevating means 23 is adapted to be upwardly moved by the drive means 40 in response to arrival of the movable carrier 10' at the delivery position. The support means 30 includes the tray locking arms 31 having the respective pairs of the forked stays 30a designed to allow the disc tray, being upwardly shifted, to slide thereover to assume the play position while causing the tray locking arms 31 to deform against their own resiliency. The tray returning means 42 is constituted by the upright shoe 10c fast with the movable carrier 10' for pushing the disc tray from the play position 35 towards the upper portion of the tray storage chamber 37 in response to return movement of the movable carrier 10' towards the receiving station. Thus, not only because the single drive means 40 is utilized to operate the tray transport means 10, the tray elevating means 23 and the tray returning means 42, but also because both of the support means 30 and the tray returning means 42 are simple in structure, the number of necessary component parts can advantageously be reduced and the operation can be stabilized.

In the embodiment so far described, each of the disc trays has one or more engagement recesses 1a and, on the other hand, the movable carrier 10' has a corresponding number of engagement projections 10b which can be received in the mating engagement recesses 1a as the movable carrier 10' moving from the delivery position approaches the receiving position. Therefore, not only can coupling between the lowermost one of the stack of the disc trays within the tray storage chamber 37 and the movable carrier 10' be assuredly achieved, but the structure necessary to accomplish this coupling can advantageously be simplified.

Moreover, the movable carrier 10' of the tray transport means 10 has the rack gear 10a. The drive means 40 includes the rack 13 movable in a direction conforming to the direction of movement of the movable carrier 10', the drive rack 12 movable in the direction conforming to the direction of movement of the movable carrier 10' and including the spur gear assembly 15 meshed on one hand with the rack gear 10a and the rack 13, the drive motor 20 including the speed reduction mechanism operatively associated with the drive rack 12, and the locking means 22 for locking the rack 13 at the initial position before the movable carrier 10' being moved from the receiving position reaches the delivery position and also for locking the movable carrier 10' at the delivery position before the rack 13 is returned from a position aligned with the stand-by position towards the initial position. The tray elevating means 23 is driven by the rack 13. Accordingly, it is possible to allow both of the movable carrier 10' and the rack 13 to move a distance greater than the distance of movement of the drive rack 12, making it possible to minimize the stroke of movement of the drive rack 12 in one direction from a position within the tray storage chamber 37 to the position aligned with the stand-by position 34.

Also, since the pivotally supported lid 7 is disposed above both of the tray storage chamber 37 and the disc play chamber, replacement of not only the compact disc with the corresponding disc tray then held at the play position but also the compact discs in the corresponding disc trays within the tray storage chamber 37 can easily be performed. The compact disc in the disc tray held at the play position can, once it has been replaced, readily be played back.

Moreover, the tray storage chamber 37 is provided with the disc locking pin 27 that can extend through the center holes of the compact discs in the associated disc trays within the tray storage chamber 37, any possible lateral displacement of the compact discs within the associated disc trays can advantageously be avoided, which would otherwise result in an incapability of the compact disc being played.

Yet, since the pivotally supported lid 7 is provided with the disc suppressor, including the disc chucking fingers 28, for pressing the compact disc in the uppermost disc tray within the tray storage chamber, any possible rattling motion of the disc trays stacked within the tray storage chamber 37 can advantageously be avoided.

In the foregoing embodiment of the present invention, the pivotally supported lid 7 has been shown as having a size sufficient to cover both of the top openings of the chambers in the housing 8. Instead of the use of the single pivotally supported lid 7, separate pivotally supported lids, indicated by 7e and 7f, respectively, may be employed in accordance with a second preferred embodiment of the present invention as shown in FIG. 12.

Figure 12:
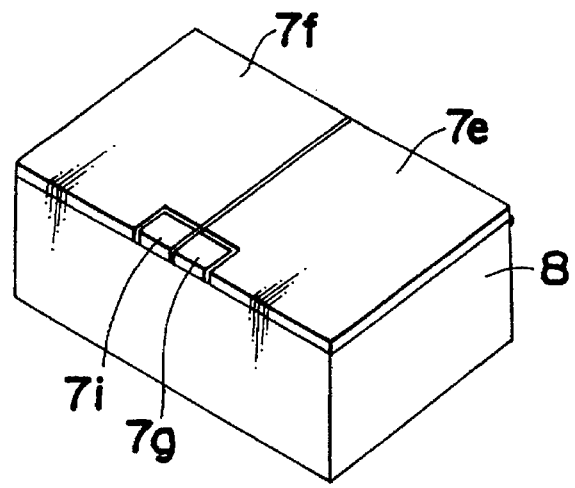
FIG. 12 is a schematic perspective view showing the disc changer according to a second preferred embodiment of the present invention.

Referring now to FIG. 12, the pivotally supported lid 7e is used to selectively open and close the top opening of the tray storage chamber 37 whereas the pivotally supported lid 7f is used to selectively open and close the top opening of the disc play chamber. These pivotally supported lid 7e and 7f have respective lock buttons 7g and 7i. While these pivotally supported lid 7e and 7f are hinged to the top edge of the rear wall segment of the housing 8, means for selectively opening and closing each of the pivotally supported lids 7e and 7f may be identical with that employed in the foregoing embodiment, that is, the drive means 40. Alternatively, separate drive means such as, for example, drive motors, may be employed one for each of the pivotally supported lids 7e and 7f.

Again, alternatively, each of the pivotally supported lids 7e and 7f may be made manually operable and, in such case, the use is preferred of springs for urging the respective pivotally supported lids 7e and 7f towards their respective opened positions. Once any one of the pivotally supported lids 7e and 7f is closed, the associated lock button 7g or 7i will keep the pivotally supported lid in the closed position unless the lock button 7g or 7i is released manually.

Figure 13:
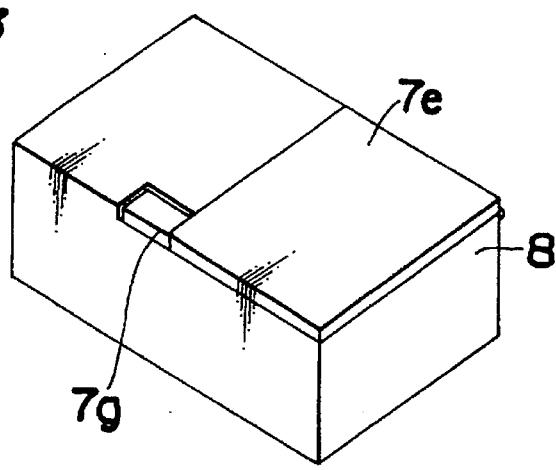
FIG. 13 is a view similar to FIG. 12, showing the disc changer according to a third preferred embodiment of the present invention.

FIG. 13 illustrates a third preferred embodiment of the present invention, in which the top opening of the disc play chamber is permanently closed by a lid and only the pivotally supported lid 7e is used to selectively open and close the top opening of the tray storage chamber 37. In this third embodiment of FIG. 13, the lock button 7g associated with the pivotally supported lid 7e is disposed off from the pivotally supported lid 7e and on a portion adjacent the top opening of the disc play chamber. According to this embodiment, the one or more of the disc trays stacked within the tray storage chamber 37 can readily be replaced or removed. The disc tray then held at the play position can also be replaced or removed when it is returned into the tray storage chamber 37 in the manner as hereinbefore discussed.

Although the present invention has been described in connection with the preferred embodiments thereof with reference to the accompanying drawings, it is to be noted that various changes and modifications are apparent to those skilled in the art. For example, although reference has been made to the use of the three disc trays, the number of the disc trays that can be accommodated in the disc changer of the present invention may not be limited to three, but may be two or four or more.

In addition, although the housing 8 has been shown and described as dedicated to the disc changer in describing any one of the preferred embodiments of the present invention, the housing 8 may be a part of the casing for a standard CD player, a standard CD cassette player or a standard CD radio cassette player.

Accordingly, such changes and modifications are to be understood as included within the scope of the present invention as defined by the appended claims, unless they depart therefrom.

What is claimed is:

1. An automatic disc changer comprising:
   a tray storage section for accommodating a stack of disc trays each having a disc support surface;
   a play section, adjoining said tray storage section, having an information pick-up unit disposed therein, said information pick-up unit being supported in said play section for movement up and down between elevated and lowered positions corresponding respectively to a play position and a stand-by position;

a tray transport means movable between a tray receiving position within said tray storage section, and a tray delivery position within said play section, for transporting a lowermost disc tray, of a stack of the disc trays within said tray storage section, to the stand-by position immediately above said information pick-up unit as said tray transport means moves from the receiving position towards the delivery position, wherein remaining disc trays of the stack of disc trays within the tray storage section are lowered by the effect of gravitational force in a movement direction once the lowermost disc tray has been transported towards the stand-by position;

a tray elevating means, carrying the information pickup unit and operable in response to arrival of said tray transport means at the delivery position, for elevating a disc tray, delivered to the stand-by position, towards the play position along with the information pick-up unit in a direction substantially parallel to the movement direction of the disc trays stacked within the disc storage section;

a support means for supporting a disc tray, once transported to the play position by said tray elevating means, at the play position such that information recording or playback can take place while the disc tray is held at the play position by said support means; and a tray returning means for returning a disc tray from the play position back to the tray storage section in a position immediately above the stack of the disc trays remaining within the tray storage section after the information recording or playback has been completed.

2. The disc changer as claimed in claim 1, wherein:

said tray transport means includes a movable carrier movable between the receiving and delivery positions, and a drive means for driving the movable carrier between the receiving and delivery positions;

said tray elevating means is driven by said drive means to elevate simultaneously with movement of said movable carrier towards the delivery position to transport a disc tray towards the stand-by position;

said support means includes tray locking arms having respective pairs of forked stays which are elastically deformable upon contact with a rim of a disc tray to allow the disc tray to pass until the disc tray rests on the forked stays; and said tray returning means comprises an upright projection provided on the movable carrier for pushing a disc tray from the play position back towards said tray storage section in response to return movement of said movable carrier from the delivery position towards the receiving position.

3. The disc changer as claimed in claim 2, wherein said movable carrier has an engaging element for engaging a counter-engaging element on a disc tray to connect the lowermost one of the stack of the disc trays with said movable carrier.

4. The disc changer as claimed in claim 3, wherein said movable carrier of said tray transport means includes a rack gear;

wherein said drive means includes a first drive rack movable in a direction conforming to the direction of movement of said movable carrier, a second drive rack movable in the direction conforming to the direction of movement of said movable carrier, a spur gear assembly engageable with said rack gear and said first drive rack, a drive motor including a speed reduction mechanism operatively associated with the second drive rack, and a locking means for locking said first drive rack at an initial position before said movable carrier is moved from the receiving position and reaches the delivery position, and for locking said movable carrier at the delivery position before said first drive rack is returned from a position aligned with the stand-by position; and wherein said tray elevating means is driven by said first drive rack.

5. The disc changer as claimed in claim 4, further comprising a pivotally supported lid disposed above said tray storage section and said play section for facilitating disc replacement.

6. The disc changer as claimed in claim 5, wherein said tray storage section includes a disc locking pin adapted to extend through respective center holes of information carrier discs, in stacked respective disc trays, from below the stacked trays in said tray storage section.

7. The disc changer as claimed in claim 6, wherein said pivotally supported lid is provided with a disc suppressor including a plurality of pivotally supported disc chucking fingers which are operable in contact with said disc locking pin to press an uppermost information carrier disc in the stack of disc trays within said tray storage section.

8. The disc changer as claimed in claim 4, further comprising a pivotally supported lid disposed above said tray storage section for facilitating disc replacement.

9. The disc changer as claimed in claim 8, wherein said tray storage section includes a disc locking pin adapted to extend through respective center holes of information carrier discs, in stacked respective disc trays, from below the stacked trays in said tray storage section.

10. The disc changer as claimed in claim 9, wherein said pivotally supported lid is provided with a disc suppressor including a plurality of pivotally supported disc chucking fingers, said disc suppressor being operable upon contact with said disc locking pin to press an uppermost information carrier disc in the stack of disc trays within said tray storage section.

11. An automatic disc changer comprising:

a housing defining a play section and a tray storage section dimensioned to accommodate a stack of disc trays;

an information pick-up unit disposed in said play section, said information pick-up unit being supported in said play section and being operable to move upward and downward between elevated and lowered positions corresponding respectively to a play position and a stand-by position;

a tray transport device capable of moving between a tray receiving position within said tray storage section, and a tray delivery position within said play section, said tray transport device operable to transport a lowermost disc tray, of a stack of the disc trays located within said tray storage section, to the stand-by position immediately above said information pick-up unit as said tray transport device moves from the receiving position towards the delivery position, wherein remaining disc trays of the stack of disc trays will move downwardly due to gravity in a movement direction once the lowermost disc tray has been transported in a direction towards the stand-by position;

a tray elevator operable to elevate a disc tray from the stand-by position towards the play position in a direction substantially parallel to the movement direction of the disc trays stacked within the disc storage section, wherein said information pick-up unit is carried by said tray elevator and is operable in response to arrival of said tray transport device at the delivery position;

a first disc tray support member positioned on a side of said play section;

a second disc tray support member positioned on a side of said play section opposite to said first disc tray support member, wherein said first and second support members are adapted to support a disc tray at the play position; and a disc tray return mechanism operable to return a disc tray from the play position back to the tray storage section in a position immediately above the stack of disc trays remaining within said tray storage section.

12. The disc changer as claimed in claim 11, wherein:

said tray transport device includes a movable carrier movable between the receiving and delivery positions, and a drive mechanism capable of driving the movable carrier between the receiving and delivery positions;

said tray elevator is driven by said drive mechanism to elevate, in unison with movement of said movable carrier towards the delivery position, a disc tray towards the stand-by position;

said first and second disc support members each including tray locking arms each having respective forked stays which are elastically deformable upon contact with a rim of a disc tray to allow the disc tray to pass thereover until the disc tray rests on said forked stays; and said disc tray return mechanism is constituted by an upright projection provided on the movable carrier for pushing a disc tray from the play position back towards said tray storage section in response to return movement of said movable carrier from the delivery position towards the receiving position.

13. The disc changer as claimed in claim 12, wherein said movable carrier has an engaging element for engaging a counter-engaging element on a disc tray to connect the lowermost one of the stack of the disc trays with said movable carrier.

14. The disc changer as claimed in claim 13, wherein said movable carrier of said tray transport device includes a rack gear;

wherein said drive mechanism includes a first drive rack movable in a direction conforming to the direction of movement of said movable carrier, a second drive rack movable in the direction conforming to the direction of movement of said movable carrier, a spur gear assembly engageable with said rack gear and said first drive rack, a drive motor including a speed reduction mechanism operatively associated with said second drive rack, and a locking means for locking said first drive rack at an initial position before said movable carrier is moved from the receiving position and reaches the delivery position, and also for locking said movable carrier at the delivery position before said rack is returned from a position aligned with the stand-by position towards the initial position; and wherein said tray elevator is driven by said first drive rack.

15. The disc changer as claimed in claim 14, further comprising a pivotally supported lid disposed above said tray storage section and said play section.

16. The disc changer as claimed in claim 15, wherein said tray storage section includes a disc locking pin mounted in said tray storage section and extending upwardly therefrom.

17. The disc changer as claimed in claim 16, wherein said pivotally supported lid is provided with a disc suppressor including a plurality of pivotally supported disc chucking fingers which are operable in contact with said disc locking pin for pressing the information carrier disc in an uppermost disc of the stack of disc trays within said tray storage section.

18. The disc changer as claimed in claim 14, further comprising a pivotally supported lid disposed above said tray storage section.

19. The disc changer as claimed in claim 18, wherein said tray storage section includes a disc locking pin mounted in said tray storage section and extending upwardly therefrom.

20. The disc changer as claimed in claim 19, wherein said pivotally supported lid is provided with a disc suppressor including a plurality of pivotally supported disc chucking fingers, said disc suppressor being operable upon contact with said disc locking pin for pressing an uppermost the information carrier disc in the stack of the disc trays within said tray storage section.

* * * * *